United States Patent
Baskar et al.

(10) Patent No.: US 11,453,093 B2
(45) Date of Patent: Sep. 27, 2022

(54) RECIPROCATING TOOL HAVING PLANETARY GEAR ASSEMBLY AND COUNTERWEIGHTING ASSEMBLY

(71) Applicant: Black & Decker Inc., Newark, DE (US)

(72) Inventors: Ashok Samuel Baskar, Glen Arm, MD (US); David C. Tomayko, Ellicott City, MD (US); Christopher S. Mougeotte, Reistertown, MD (US); Brent A. Kuehne, Red Lion, PA (US)

(73) Assignee: Black & Decker Inc., New Britain, CT (US)

( * ) Notice: Subject to any disclaimer, the term of this patent is extended or adjusted under 35 U.S.C. 154(b) by 588 days.

(21) Appl. No.: 16/450,538

(22) Filed: Jun. 24, 2019

(65) Prior Publication Data

US 2020/0398393 A1    Dec. 24, 2020

(51) Int. Cl.
*B23Q 5/027* (2006.01)
*B23D 51/16* (2006.01)
*F16H 37/12* (2006.01)
*F16H 1/28* (2006.01)
*F16H 21/36* (2006.01)
(Continued)

(52) U.S. Cl.
CPC .............. *B23Q 5/027* (2013.01); *B23D 51/16* (2013.01); *F16F 15/28* (2013.01); *F16H 1/28* (2013.01); *F16H 21/18* (2013.01); *F16H 21/36* (2013.01); *F16H 37/124* (2013.01)

(58) Field of Classification Search
CPC ......... B23D 51/16; B23B 5/027; F16H 21/18; F16H 21/34; F16H 37/124; F16H 2037/128
See application file for complete search history.

(56) References Cited

U.S. PATENT DOCUMENTS

| | | |
|---|---|---|
| 1,525,070 A | 2/1925 | Coleman |
| 2,931,402 A | 4/1960 | Papworth |

(Continued)

FOREIGN PATENT DOCUMENTS

| | | |
|---|---|---|
| CN | 104209586 A | 12/2014 |
| DE | 803142 C | 3/1951 |

(Continued)

*Primary Examiner* — Tinh Dang
(74) *Attorney, Agent, or Firm* — Michael Aronoff

(57) ABSTRACT

A power-driven reciprocating tool may include a transmission mechanism that converts rotational force from a motor to linear force to be output by a reciprocating mechanism coupled thereto, and a counterbalancing mechanism coupled to the transmission mechanism to counter-balance forces generated by the reciprocating mechanism. The transmission mechanism may include a planetary gear assembly including a sun gear in meshed engagement with at least one planet gear. In response to a force converted by and transmitted from the transmission mechanism, the reciprocating mechanism may move in a first linear direction, and the counterbalancing mechanism may move in a second linear direction, opposite the first linear direction. The opposite linear movement of the reciprocating mechanism and the counterbalancing mechanism may counteract forces generated by the reciprocating motion of the reciprocating mechanism, thus reducing vibration output by the tool.

22 Claims, 26 Drawing Sheets

(51) Int. Cl.
*F16F 15/28* (2006.01)
*F16H 21/18* (2006.01)

(56) References Cited

U.S. PATENT DOCUMENTS

| | | |
|---|---|---|
| 2,949,944 A | 8/1960 | Blachly |
| 2,970,484 A | 2/1961 | Springer |
| 3,095,748 A | 7/1963 | Stelljes et al. |
| 3,205,721 A | 9/1965 | Speer |
| 3,457,796 A | 7/1969 | Leach et al. |
| 3,655,021 A | 4/1972 | Froio |
| 3,688,522 A | 9/1972 | Schmuck |
| 3,729,823 A | 5/1973 | Bos et al. |
| 3,766,362 A | 10/1973 | Pell et al. |
| 3,978,862 A | 9/1976 | Morrison |
| 4,145,811 A | 3/1979 | Kendzior |
| 4,482,042 A | 11/1984 | Siska et al. |
| 5,025,562 A | 6/1991 | Palm |
| 5,050,307 A | 9/1991 | Palm |
| 5,099,705 A | 3/1992 | Dravnieks |
| 5,134,777 A | 8/1992 | Meyer et al. |
| 5,212,887 A * | 5/1993 | Farmerie ............ F16F 7/10 30/392 |
| RE35,258 E | 6/1996 | Palm |
| 5,561,909 A | 10/1996 | Berg et al. |
| 5,566,458 A | 10/1996 | Palm |
| 5,598,636 A | 2/1997 | Stolzer |
| 5,607,023 A | 3/1997 | Palm |
| 5,689,891 A | 11/1997 | Bednar et al. |
| 5,964,039 A | 10/1999 | Mizoguchi et al. |
| 6,012,346 A | 1/2000 | Vo |
| RE37,211 E | 6/2001 | Bednar et al. |
| 6,249,979 B1 | 6/2001 | Bednar et al. |
| 6,282,797 B1 | 9/2001 | Osada et al. |
| 6,286,217 B1 | 9/2001 | Dassoulas et al. |
| RE37,529 E | 1/2002 | Bednar et al. |
| 6,357,125 B1 * | 3/2002 | Feldmann ............ B23D 51/16 30/277.4 |
| D455,328 S | 4/2002 | Bruno |
| 6,370,781 B1 * | 4/2002 | Sasaki ............ B23D 49/162 30/392 |
| 6,508,151 B1 | 1/2003 | Neitzell |
| 6,634,107 B2 | 10/2003 | Osada |
| 6,634,437 B1 | 10/2003 | Rudolph |
| 6,662,455 B2 | 12/2003 | Tachibana et al. |
| 6,758,119 B1 | 7/2004 | Neitzell |
| RE38,606 E | 10/2004 | Bednar et al. |
| 6,829,831 B1 | 12/2004 | Neitzell |
| 6,851,193 B2 | 2/2005 | Bednar et al. |
| 6,860,886 B1 | 3/2005 | Lee |
| 6,877,235 B2 | 4/2005 | Osada |
| 6,976,313 B2 | 12/2005 | Wong |
| 7,127,973 B2 | 10/2006 | Neitzell et al. |
| 7,188,425 B2 | 3/2007 | Bednar et al. |
| 7,191,847 B2 | 3/2007 | Haas |
| 7,363,713 B2 | 4/2008 | Kobayashi et al. |
| 7,448,137 B2 | 11/2008 | Neitzell et al. |
| 7,506,447 B2 | 3/2009 | Wheeler et al. |
| 7,637,018 B2 | 12/2009 | Zhang |
| 7,707,729 B2 | 5/2010 | Moreno |
| 7,793,420 B2 | 9/2010 | Griep et al. |
| 7,818,887 B2 | 10/2010 | Saegesser et al. |
| 7,996,996 B2 | 8/2011 | Hirabayashi |
| 8,230,608 B2 | 7/2012 | Oberheim |
| 8,307,910 B2 | 11/2012 | Holmes et al. |
| D674,263 S | 1/2013 | Aglassinger |
| 8,371,032 B2 | 2/2013 | Hirabayashi |
| 8,403,075 B2 | 3/2013 | Schlesak et al. |
| 8,407,901 B2 | 4/2013 | Oberheim |
| 8,407,902 B2 | 4/2013 | Naughton et al. |
| 8,763,722 B2 | 7/2014 | Braun et al. |
| 8,905,153 B2 | 12/2014 | Braun et al. |
| 9,061,411 B2 | 6/2015 | Naughton et al. |
| 9,132,491 B2 | 9/2015 | Alberti et al. |
| 9,156,097 B2 | 10/2015 | Neitzell et al. |
| 9,233,427 B2 | 1/2016 | Alberti et al. |
| 9,272,347 B2 | 3/2016 | Holmes et al. |
| 9,393,681 B2 | 7/2016 | Werner |
| 9,470,273 B2 | 10/2016 | Lang et al. |
| 9,561,552 B2 | 2/2017 | Kocsis et al. |
| 9,573,207 B2 | 2/2017 | Sugita et al. |
| 9,579,735 B2 | 2/2017 | Wattenbach et al. |
| 9,724,771 B2 | 8/2017 | Aoki et al. |
| 10,144,106 B2 | 12/2018 | Mclain et al. |
| 10,259,060 B2 | 4/2019 | Sugino et al. |
| 11,229,963 B2 | 1/2022 | Mougeotte et al. |
| 2003/0121389 A1 | 7/2003 | Wheeler et al. |
| 2004/0194987 A1 | 10/2004 | Hanke et al. |
| 2004/0231170 A1 | 11/2004 | Neitzell et al. |
| 2004/0261273 A1 | 12/2004 | Griep et al. |
| 2005/0016001 A1 | 1/2005 | Griep et al. |
| 2005/0252670 A1 * | 11/2005 | Prell ............ B25F 3/00 173/39 |
| 2006/0124331 A1 | 6/2006 | Stirm et al. |
| 2007/0017684 A1 | 1/2007 | Stirm et al. |
| 2007/0074407 A1 | 4/2007 | Serdynski et al. |
| 2007/0135803 A1 | 6/2007 | Belson |
| 2008/0251568 A1 | 10/2008 | Zemlok et al. |
| 2008/0287944 A1 | 11/2008 | Pearson et al. |
| 2008/0289843 A1 | 11/2008 | Townsan |
| 2008/0308602 A1 | 12/2008 | Timm et al. |
| 2008/0308606 A1 | 12/2008 | Timm et al. |
| 2008/0308607 A1 | 12/2008 | Timm et al. |
| 2010/0162579 A1 | 7/2010 | Naughton et al. |
| 2010/0320252 A1 | 12/2010 | Viola et al. |
| 2011/0107608 A1 | 5/2011 | Wattenbach et al. |
| 2011/0139475 A1 | 6/2011 | Braun et al. |
| 2011/0315413 A1 | 12/2011 | Fisher et al. |
| 2012/0096721 A1 * | 4/2012 | Sinur ............ B23D 51/16 30/392 |
| 2012/0192440 A1 * | 8/2012 | Jerabek ............ B23D 49/165 30/514 |
| 2012/0261153 A1 | 10/2012 | Aoki |
| 2013/0019483 A1 | 1/2013 | Naughton et al. |
| 2013/0055576 A1 | 3/2013 | Holmes et al. |
| 2013/0062090 A1 | 3/2013 | Winnard |
| 2013/0199812 A1 | 8/2013 | Dangelmaier et al. |
| 2013/0247391 A1 | 9/2013 | Armstrong |
| 2014/0171966 A1 | 6/2014 | Giordano et al. |
| 2014/0245620 A1 | 9/2014 | Fankhauser et al. |
| 2014/0299345 A1 | 10/2014 | Mcroberts et al. |
| 2015/0136433 A1 | 5/2015 | Nitsche et al. |
| 2015/0296719 A1 * | 10/2015 | Kuehne ............ A01G 3/053 30/216 |
| 2016/0243634 A1 * | 8/2016 | Komazaki ............ B23D 51/16 |
| 2017/0129026 A1 | 5/2017 | Wattenbach et al. |
| 2018/0370012 A1 | 12/2018 | Zheng |
| 2019/0061081 A1 | 2/2019 | Schaer |
| 2020/0063827 A1 | 2/2020 | Courtial et al. |
| 2020/0070265 A1 | 3/2020 | Wang |

FOREIGN PATENT DOCUMENTS

| | | |
|---|---|---|
| DE | 1870185 U | 4/1963 |
| DE | 1673054 A1 | 8/1971 |
| DE | 102007017408 B3 | 8/2008 |
| DE | 102007062869 A1 | 8/2008 |
| DE | 102012210678 A1 | 1/2014 |
| DE | 102006041430 B4 | 3/2015 |
| DE | 102017115754 A1 | 1/2018 |
| EP | 0561473 B1 | 1/1998 |
| EP | 1980351 A2 | 10/2008 |
| EP | 2481508 B1 | 6/2016 |
| EP | 3053686 A1 | 8/2016 |
| EP | 2119536 B1 | 8/2017 |
| EP | 3038779 B1 | 3/2020 |
| EP | 3038780 B1 | 4/2020 |
| EP | 3632603 A1 | 4/2020 |
| FR | 2451242 A1 | 10/1980 |
| GB | 2042973 A | 10/1980 |
| JP | 2009083332 A | 4/2009 |
| JP | 2009101432 A | 5/2009 |

(56) References Cited

FOREIGN PATENT DOCUMENTS

| JP | 2011115912 A | 6/2011 |
|---|---|---|
| NO | 2015145912 A1 | 10/2015 |
| WO | 2015155912 A1 | 10/2015 |

* cited by examiner

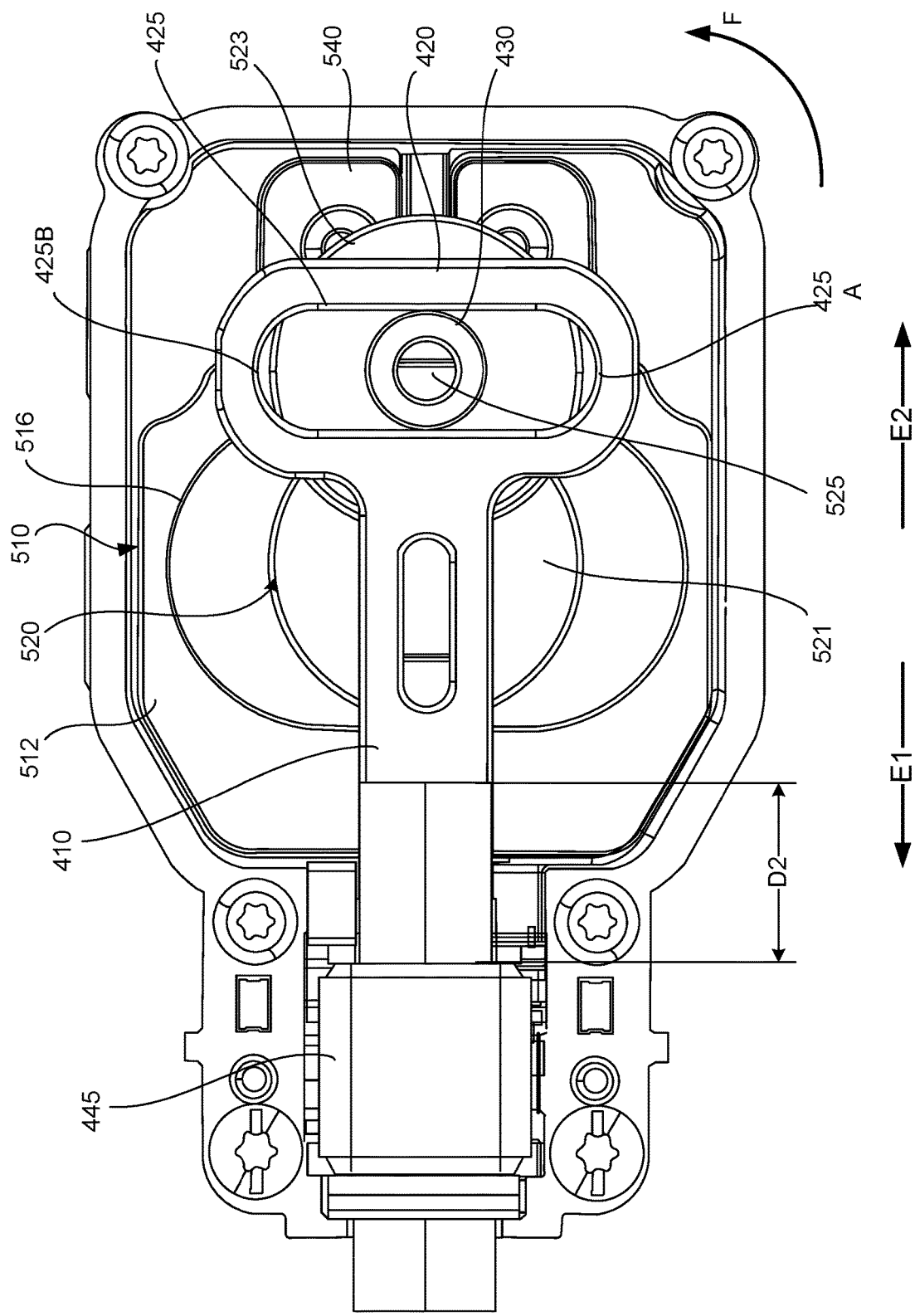

RECIPROCATING TOOL HAVING PLANETARY GEAR ASSEMBLY AND COUNTERWEIGHTING ASSEMBLY

FIELD

This document relates, generally, to a reciprocating mechanism for a power tool, and in particular to a reciprocating mechanism with a counterbalancing mechanism for a reciprocating power tool

BACKGROUND

Reciprocating mechanisms may be included in various different types of tools, for example, reciprocating saws and jig saws, to convert rotary force, or motion, to linear force, or motion, and/or to convert linear force/motion to rotary force/motion, for output by the tool. Operation of a motor of this type of power tool may generate a force, for example, a rotational force. A reciprocating mechanism may convert the rotational force, or rotational motion, output by the motor to a linear force, or linear motion, to drive a reciprocal motion of an output spindle of the tool. The reciprocating mechanism may be coupled to the motor by, for example, a transmission mechanism that provides for force transfer between the motor and the reciprocating mechanism. Vibration generated due to operation of the motor and the reciprocating mechanism, for example, as a result of acceleration/ deceleration at extreme ends of travel of the reciprocating mechanism, particularly as operational speed and/or stroke length of the output spindle is increased, may adversely affect operation of the tool, and may produce user fatigue. Providing for balance in the reciprocating mechanism may improve user control of the tool, and may enhance utility and operational safety, enabling a user to operate the tool for extended periods of time, versus a limited duration, for a tool which may otherwise have relatively high vibration during operation. Further, a relatively compact tool profile may improve user control of the tool, and may allow the user to access smaller, tighter spaces using the tool.

SUMMARY

In one aspect, a power-driven reciprocating tool may include a motor, a reciprocating mechanism, and a planetary gear assembly coupled between the motor and the reciprocating mechanism. The planetary gear assembly may convert a rotational force generated by the motor to a linear force output by the reciprocating mechanism.

In some implementations, the planetary gear assembly may include a gear carrier, a sun gear received in the gear carrier, and coupled to an output shaft of the motor so as to receive a rotational force from the motor, at least one planet gear coupled in the gear carrier, and in meshed engagement with the sun gear, such that the carrier rotates in response to the rotational force received from the motor, and a pin fixed to and extending outward from a lower portion of the gear carrier such that the pin rotates together with the gear carrier, wherein the pin is coupled to the reciprocating mechanism. The reciprocating mechanism may be configured to reciprocate linearly in response to rotation of the pin.

In some implementations, the tool may also include a counterbalancing mechanism coupled to the pin. The counterbalancing mechanism may be configured to reciprocate linearly in response to rotation of the pin, in a direction that is opposite that of the reciprocating mechanism, so as to balance the linear reciprocating movement of the reciprocating mechanism. The reciprocating mechanism may include a reciprocating shaft having a yoke at an end portion thereof. The pin may extend through an elongated slot in the yoke so as to couple the planetary gear assembly and the reciprocating mechanism to a counterbalancing mechanism. The counterbalancing mechanism may include an eccentric member having an opening therein in which the pin is coupled, a counterbalance member, and a shaft extending from the eccentric member into an elongated slot in the counterbalance member so as to movably couple the counterbalance member to the eccentric member. In some implementations, the pin is configured to move linearly in the elongated slot in the yoke in response to rotation of the gear carrier and the pin received in the elongated slot, the eccentric member is configured to revolve about the shaft in response to the linear movement of the pin in the slot, the reciprocating mechanism is configured to reciprocate linearly along a reciprocating axis in response to the linear movement of the pin in the slot, and the counterbalance member is configured to reciprocate linearly along the reciprocating axis, in a direction opposite that of the reciprocating mechanism, in response to the revolving of the eccentric member about the shaft.

In some implementations, the tool may also include a counterbalance member, and an eccentric member coupled to the reciprocating mechanism and to the counterbalance member. The pin may be coupled in an opening formed in the eccentric member so as to couple the planetary gear assembly, the reciprocating mechanism and the counterbalance member. A bushing may be movably received in an elongated slot formed in the reciprocating mechanism, wherein the pin extends through the bushing, and into the opening formed in the eccentric member. The eccentric member may include a first disc portion wherein the opening in which the pin is received is formed in the first disc portion, and the first disc portion is movably received in an elongated slot formed in the reciprocating mechanism, a second disc portion coupled to the first disc portion such that respective central portions of the first disc portion and the second disc portion are offset, and a shaft extending outward from the second disc portion, and into the counterbalance member so as to couple the eccentric member to the counterbalance member. In some implementations, the reciprocating mechanism may be configured to reciprocate linearly in response to rotation of the gear carrier and the pin, and the counterbalance member may be configured to reciprocate linearly, in a direction opposite that of the reciprocating mechanism, in response to the rotation of the gear carrier and the pin.

In some implementations, the eccentric member may include a first disc portion having the opening formed therein in which the pin is coupled, a second disc portion coupled to, and offset from, the first disc portion, and a shaft extending outward, from the second disc portion, and into the counterbalance member so as to couple the eccentric member to the counterbalance member. In response to rotation of the gear carrier and pin coupled thereto, the pin may move linearly, along a first linear axis, in the elongated slot formed in the reciprocating mechanism, the second disc portion of the eccentric member may revolve about the shaft, the reciprocating mechanism may reciprocate along a second linear axis, and the counterbalance member may reciprocate linearly along the second linear axis, in a direction opposite that of the reciprocating mechanism so as to balance the linear reciprocating movement of the reciprocating mechanism. In some implementations, the first linear axis may be substantially orthogonal to the second linear axis.

In some implementations, the tool may also include a first guide plate on a first surface of the counterbalance member to guide the linear reciprocating movement of a yoke portion at a first end portion of the reciprocating mechanism, a second guide plate on a second surface of the counterbalance member to guide the linear reciprocating movement of the counterbalance member, and a bushing at a second end portion of the reciprocating mechanism to guide the linear reciprocating movement of a shaft portion of the reciprocating mechanism.

In another general aspect, a power-driven reciprocating tool may include a motor, a reciprocating mechanism, a transmission mechanism coupled between the motor and the reciprocating mechanism, wherein the transmission mechanism may transmit a driving force generated by the motor to the reciprocating mechanism, and the reciprocating mechanism reciprocates linearly in response to the driving force transmitted thereto by the transmission mechanism, and a counterbalancing mechanism coupled to the transmission mechanism, wherein the counterbalancing mechanism may reciprocate linearly in response to the driving force generated by the motor. A linear reciprocating direction of the counterbalancing mechanism may be opposite a linear reciprocating direction of the reciprocating mechanism, so as to balance the linear reciprocating movement of the reciprocating mechanism.

In some implementations, the counterbalancing mechanism may include a first counterbalance member, and an eccentric member coupled to the transmission mechanism, the reciprocating mechanism, and the counterbalance mechanism. The eccentric member may include a first disc portion that is fixedly coupled to the transmission mechanism, a second disc portion that is fixedly coupled to, and offset from, the first disc portion, and a shaft extending outward from the second disc portion and into an elongated slot in the first counterbalance member so as to movably couple the eccentric member and the counterbalance member. In some implementations, the counterbalancing mechanism may also include a second counterbalance member movably positioned on a reciprocating shaft of the reciprocating mechanism, and a connecting plate extending in a direction corresponding to a longitudinal direction of the reciprocating shaft. The first counterbalance member may be fixedly coupled to a first end portion of the connecting plate and the second counterbalance member may be fixedly coupled to a second end portion of the connecting plate, such that the first counterbalance member, the connecting plate, and the second counterbalance member reciprocate together.

In some implementations, the tool may also include a sleeve bearing fitted on an outer circumferential surface of the reciprocating shaft, a locking tab extending radially outward from an outer surface of the sleeve bearing, and a slot formed in the second counterweight, at a position corresponding to the locking tab, such that the locking tab moves into and out of the slot as the reciprocating mechanism and the counterbalancing mechanism reciprocate in opposite directions. A mass of the second counterweight member may be variable, based on at least one of a size of the second counterweight, an external shape of the second counterweight member, or a material of the second counterweight member. The first disc portion may include an opening formed therein in which an output pin of the transmission mechanism is fixedly coupled, and the first disc portion is movably received in a slot formed in a yoke of the reciprocating mechanism, such that the first disc portion is configured to move linearly within the slot formed in the yoke in response to rotation of the pin, and the first counterbalance member and the second counterbalance member are configured to reciprocate linearly, in a direction opposite that of the reciprocating mechanism, in response to the rotation of the pin.

In some implementations, the transmission mechanism may include a planetary gear assembly, including a gear carrier, a sun gear received in the gear carrier, and coupled to an output shaft of the motor so as to receive a rotational force from the motor, at least one planet gear coupled in the gear carrier, and in meshed engagement with the sun gear, such that the carrier rotates in response to the rotational force received from the motor, and a pin fixed to and extending outward from a lower portion of the gear carrier such that the pin rotates together with the gear carrier, wherein the pin is coupled to the reciprocating mechanism such that the reciprocating mechanism reciprocates linearly in response to rotation of the pin. The reciprocating mechanism may include a reciprocating shaft having a yoke at an end portion thereof, wherein the pin extends through an elongated slot in the yoke so as to couple the planetary gear assembly and the reciprocating mechanism to the counterbalancing mechanism.

The details of one or more implementations are set forth in the accompanying drawings and the description below. Other features will be apparent from the description and drawings, and from the claims.

BRIEF DESCRIPTION OF THE DRAWINGS

FIGS. 7A-7D illustrate phased operation of the exemplary reciprocating mechanism and the exemplary counterbalancing mechanism, in accordance with implementations described herein.

DETAILED DESCRIPTION

Figure 1:
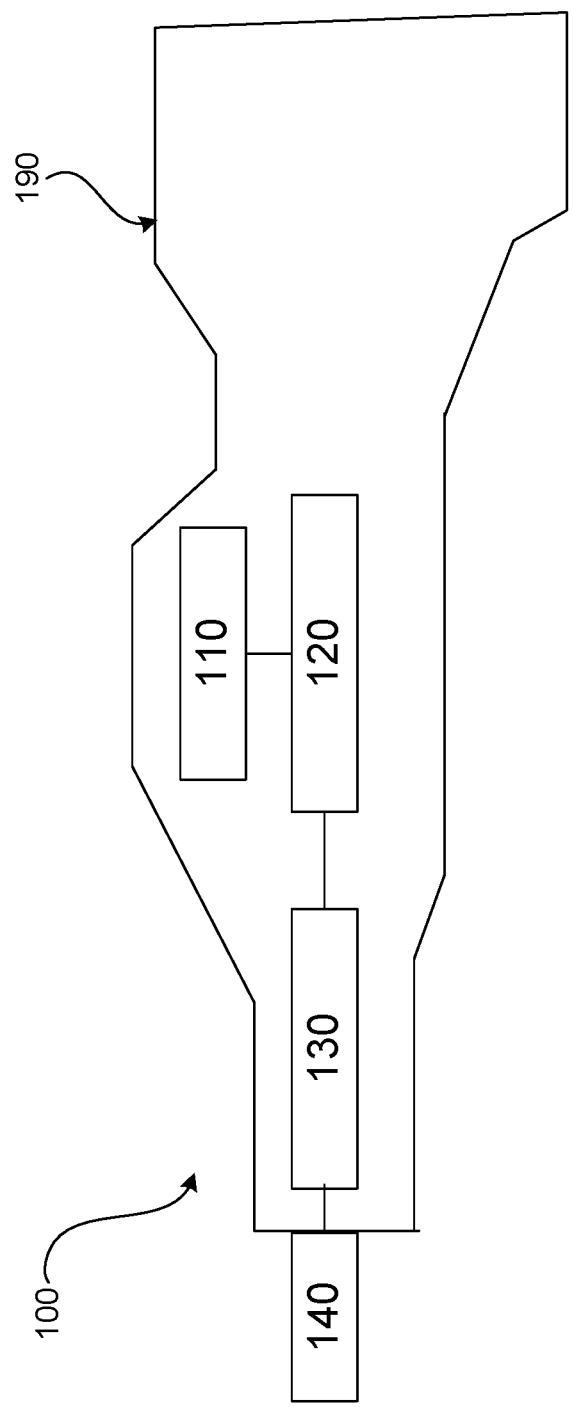
FIG. 1 is a schematic view of an exemplary power-driven reciprocating tool.

A schematic view of an exemplary power-driven tool 100 including a reciprocating mechanism is shown in FIG. 1. As shown in FIG. 1, the exemplary tool 100 may include a driving mechanism 110 generating a driving force, for example, a rotational driving force. A transmission mechanism 120 may be coupled between the driving mechanism 110 and a reciprocating mechanism 130. The transmission mechanism 120 may transfer the driving force generated by the driving mechanism 110 to the reciprocating mechanism 130. In an arrangement in which the driving force generated by the driving mechanism 110 is a rotational force, or a rotational motion, the transmission mechanism 120 may convert the rotational motion produced by the driving mechanism 110 into a linear force, or linear motion. The driving mechanism 110, the transmission mechanism 120, and the reciprocating mechanism 130 may be received in and/or coupled to a housing 190. In some implementations, an output accessory 140 (such as, for example, a blade) may be coupled to the reciprocating mechanism 130, and may extend from the housing 190, to interact with a workpiece (not shown in FIG. 1). In some implementations, the driving mechanism 110 may be an electric motor that receives power from, for example, a power storage device (such as, for example, a battery), an external electrical power source, and the like. In some implementations, the driving mechanism 110 may be an air driven, or pneumatic motor, that is powered by compressed air introduced into the housing 190 from an external compressed air source. Other types of driving mechanisms, and other sources of power, may provide for power driven operation of the tool 100.

In a powered tool that makes use of reciprocal motion, in accordance with implementations described herein, a relatively compact size, or profile, may enhance the ability to access relatively small, confined work areas with the tool, thus enhancing utility of the tool. In a powered tool that makes use of reciprocal motion, in accordance with implementations described herein, reduced vibration during operation may enhance precision, stability and utility of the tool, and may result in reduced operator fatigue during operation.

In a powered reciprocating tool, vibration may be generated by multiple sources. For example, vibration may be generated by interaction forces, or frictional forces, between an output accessory, such as a blade, and a work piece during operation. Inertial forces, due to relative movement of internal components of the tool, may cause instability and/or vibration, whether or not the tool is engaged with a work piece. For example, as internal components of the various mechanisms of the tool move and change direction, reaction forces are generated to accelerate/decelerate the component(s). In a situation in which the tool is not rigidly fixed to a mounting surface, but rather, held by an operator, the cyclic nature of this type of motion results in vibration experienced by the operator. All of this may cause opposite, reciprocal motion to be felt, or experienced, by the operator as vibration. This vibration may adversely affect precision and utility of the tool and increase operator fatigue.

Figure 2A:
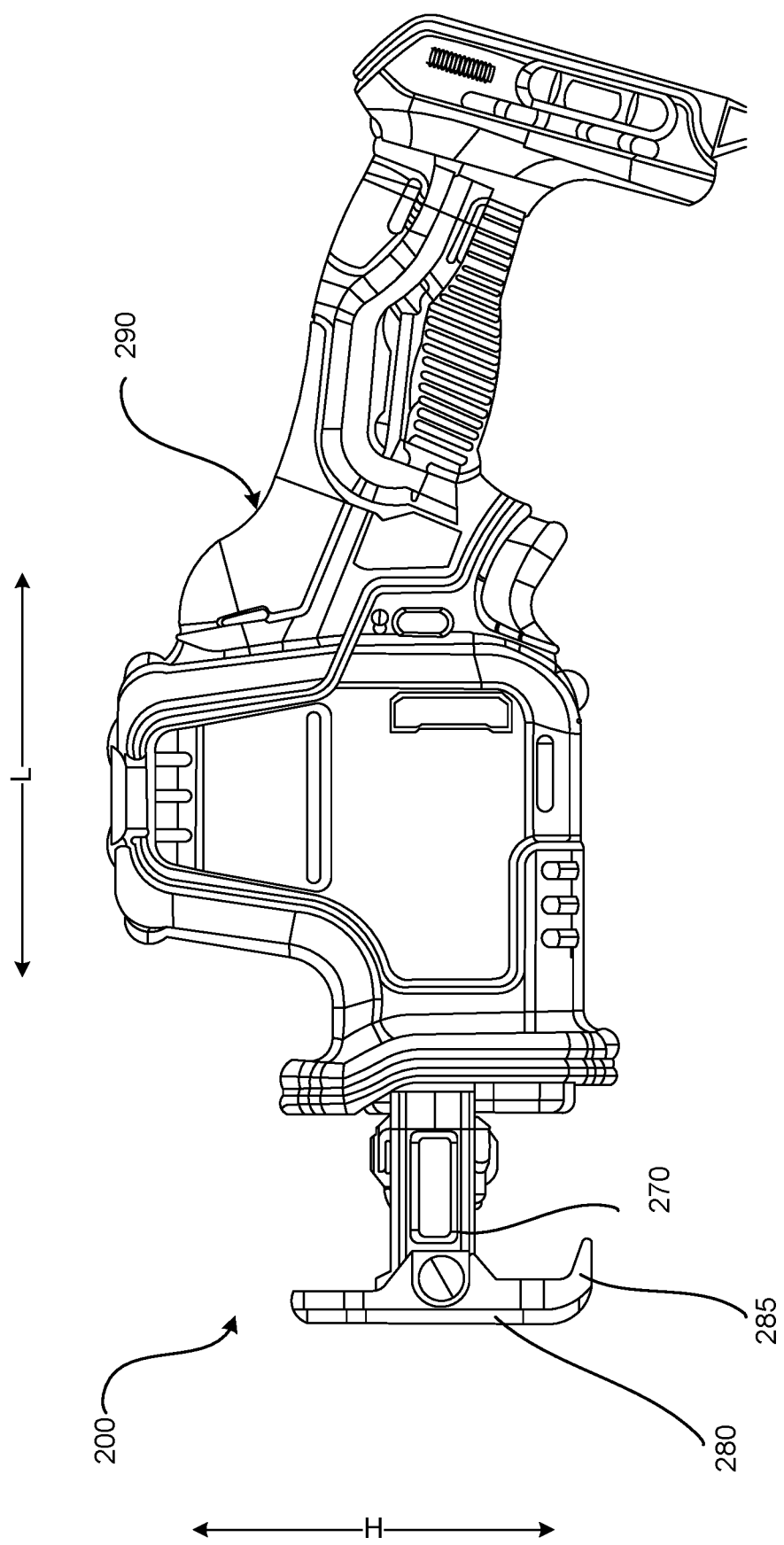
FIG. 2A is a side view.
Figure 2B:
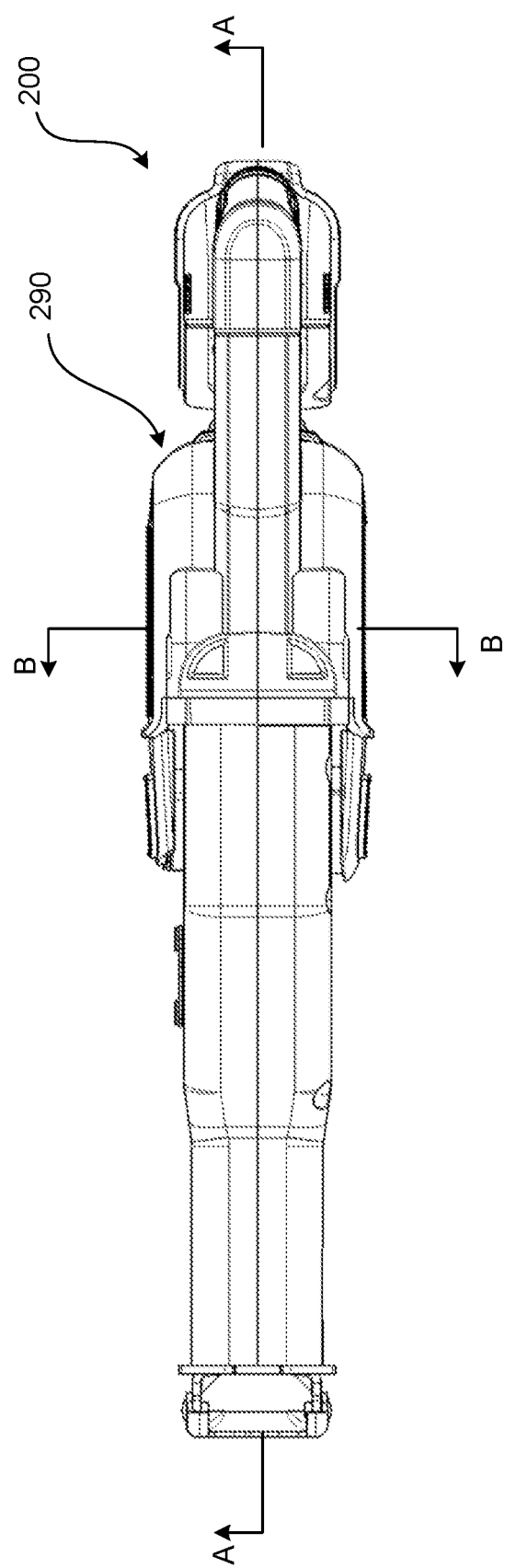
FIG. 2B is a top view, of an exemplary power-driven reciprocating tool, in accordance with implementations described herein.
Figure 3:
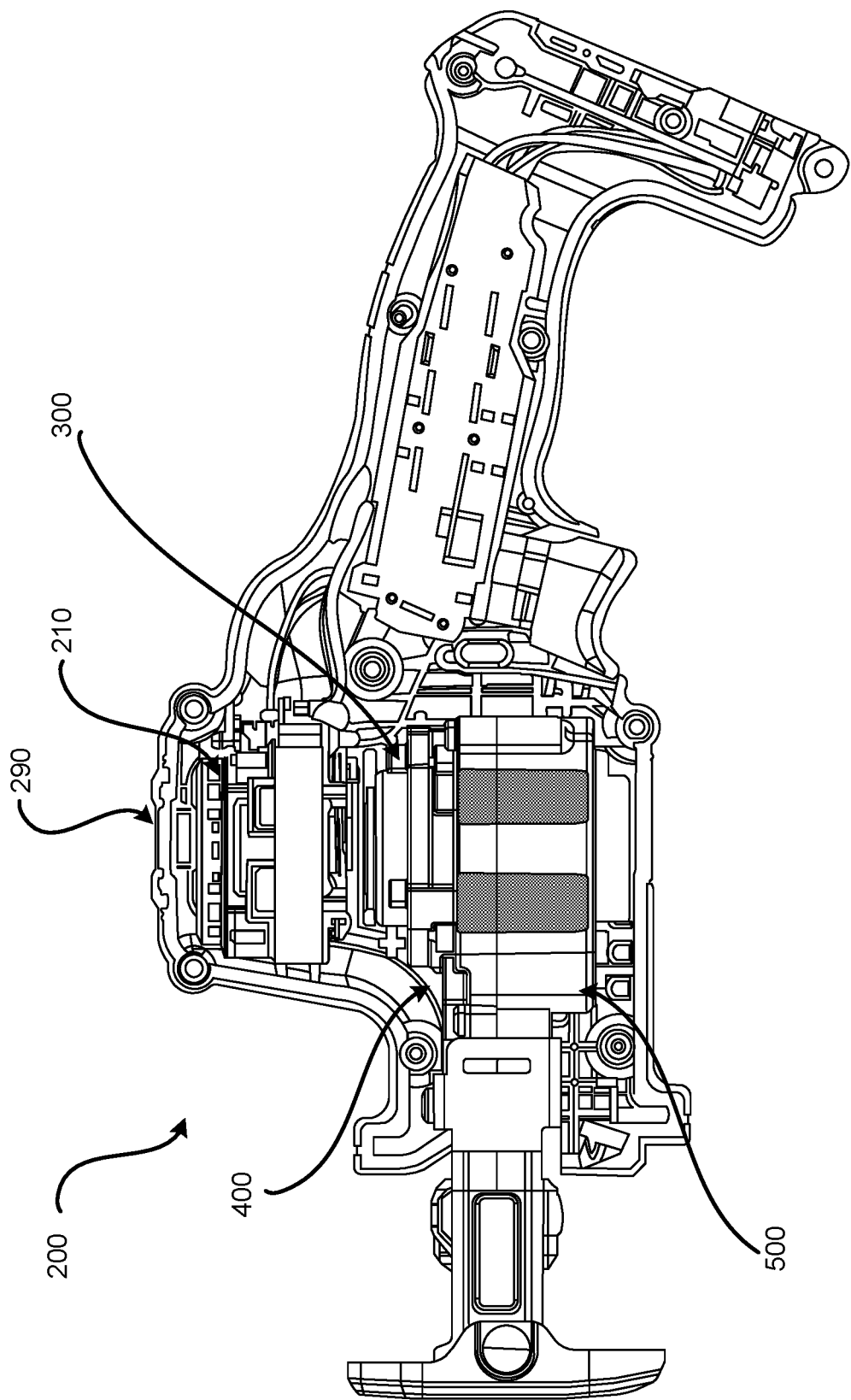
FIG. 3 is a side view of internal components of the exemplary power-driven reciprocating tool shown in FIGS. 2A and 2B, in accordance with implementations described herein.
Figure 4:
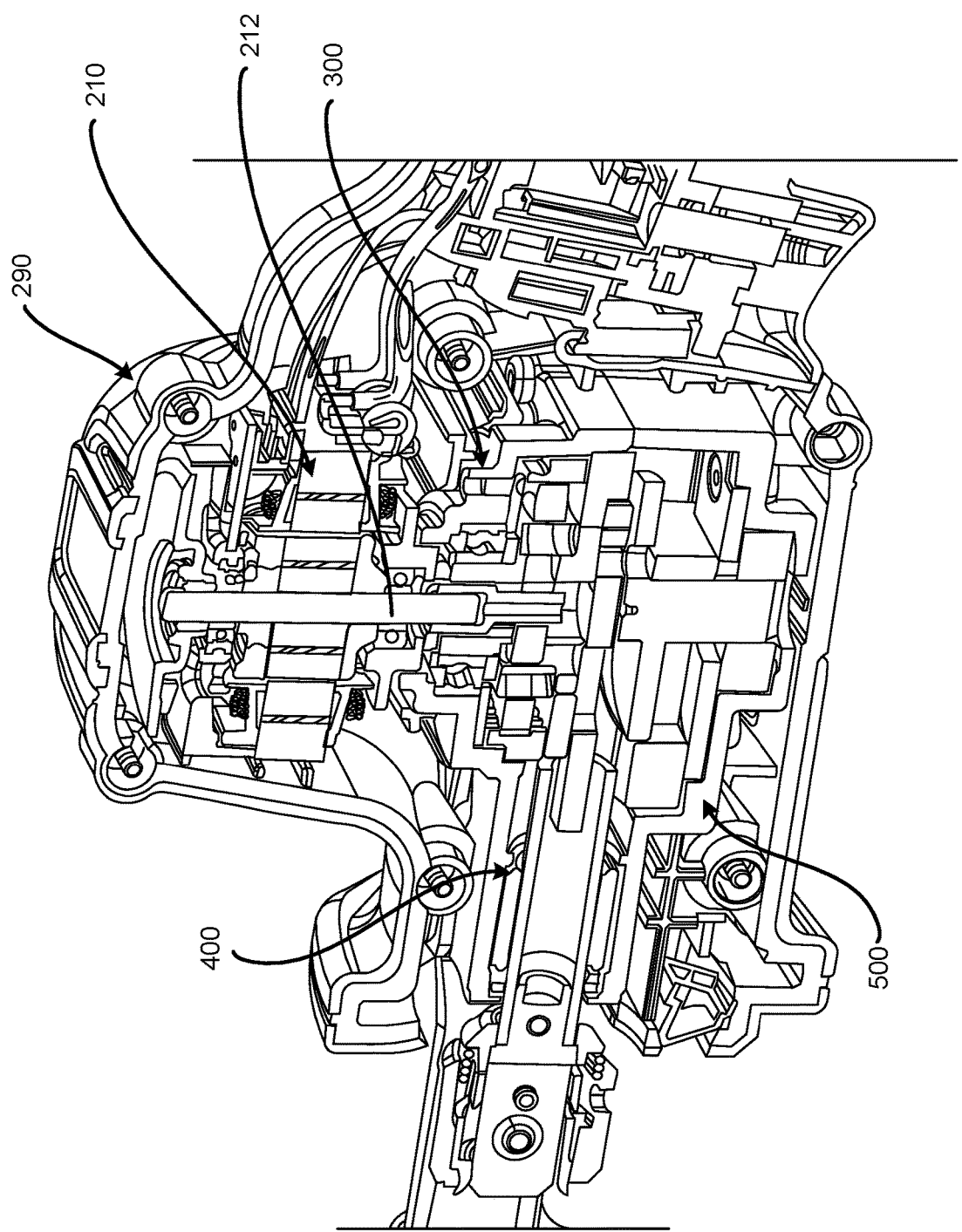
FIG. 4 is a partial cross-sectional view of the exemplary power-driven reciprocating tool shown in FIGS. 2A and 2B, in accordance with implementations described herein.

FIGS. 2A and 2B illustrate an exemplary power-driven tool 200, in accordance with implementations described herein, in which FIG. 2A is a side view, and FIG. 2B is a top view. FIG. 3 is a side view of the exemplary power-driven reciprocating tool 200 shown in FIG. 2, with a portion of a housing 290 of the tool 200 removed so that internal components of the tool 200 are visible. FIG. 4 is partial cross-sectional view of the tool shown in FIGS. 2A and 2B, taken along line A-A of FIG. 2B. The exemplary power-driven tool 200 shown in FIGS. 2A-4 is a power-driven reciprocating tool, and in particular, a power-driven reciprocating saw, simply for purposes of discussion and illustration. However, principles to be described herein may be applied to other types of power-driven tools that implement reciprocating motion, and that may benefit from a relatively compact profile, or size, and a balanced reciprocating mechanism (such as, for example, jig saws, scroll saws, oscillating tools, air driven compressors, and the like).

As shown in FIGS. 2A-4, the exemplary power-driven tool 200, in accordance with implementations described herein, may include a driving mechanism 210, for example, a motor 210, a transmission mechanism 300, and a reciprocating mechanism 400. The driving mechanism 210, the transmission mechanism 300 and the reciprocating mechanism 400 may be received in a tool housing 290. The transmission 300 may convert a driving force, for example, a rotational force, generated by the driving mechanism 210, to a linear force to be output by the reciprocating mechanism 400. In some implementations, a counterweighting mechanism 500 may be coupled to the reciprocating mechanism 400. In some implementations, the counterweighting mechanism 500 may counteract imbalances generated by the driving and reciprocating mechanisms 210, 400 during operation.

Figure 5A:
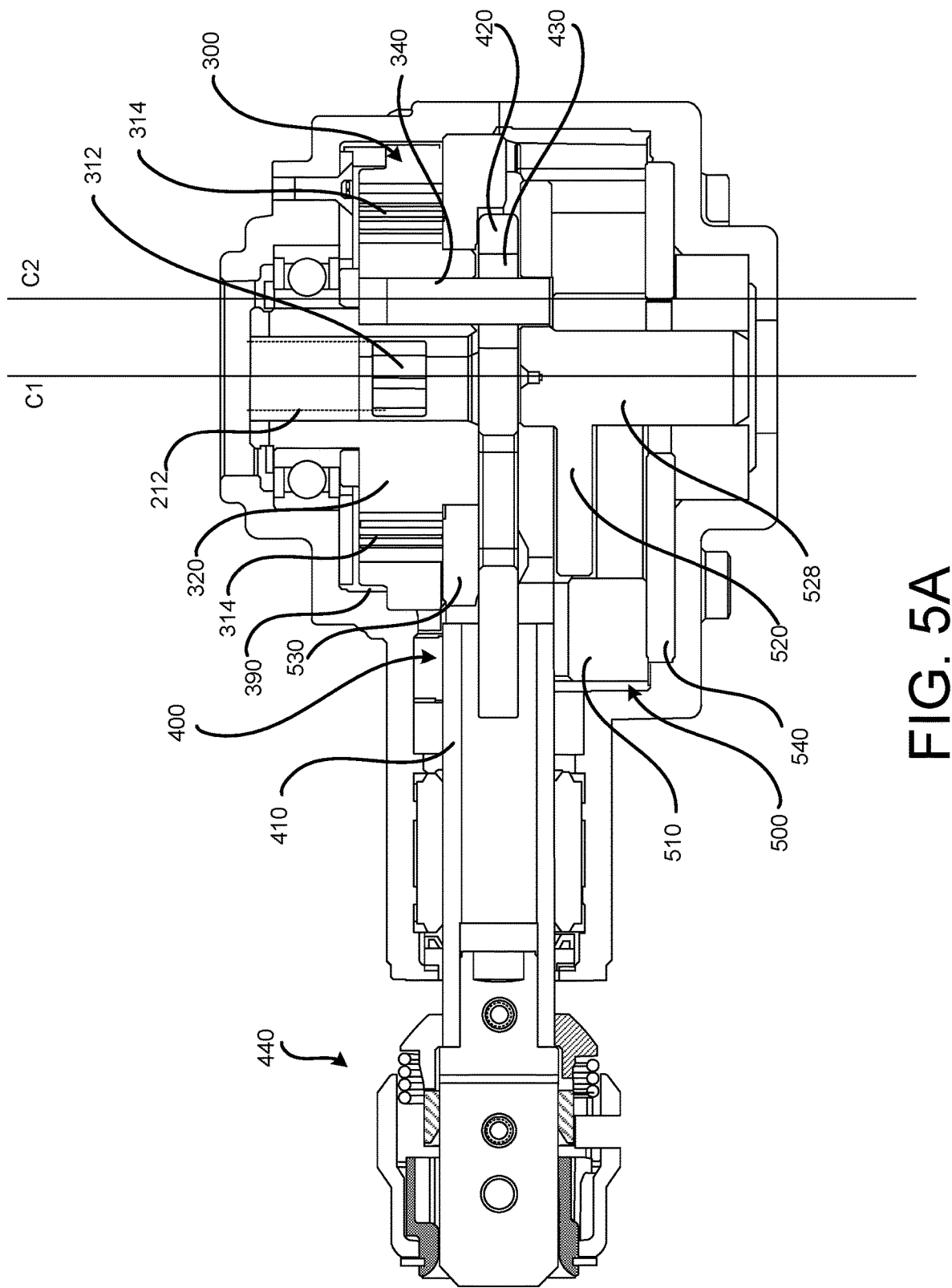
FIG. 5A is an assembled side view of an exemplary transmission mechanism, an exemplary reciprocating mechanism, and an exemplary counterbalancing mechanism of the exemplary power-driven reciprocating tool shown in FIGS. 2A-4, in accordance with implementations described herein.
Figure 5B:
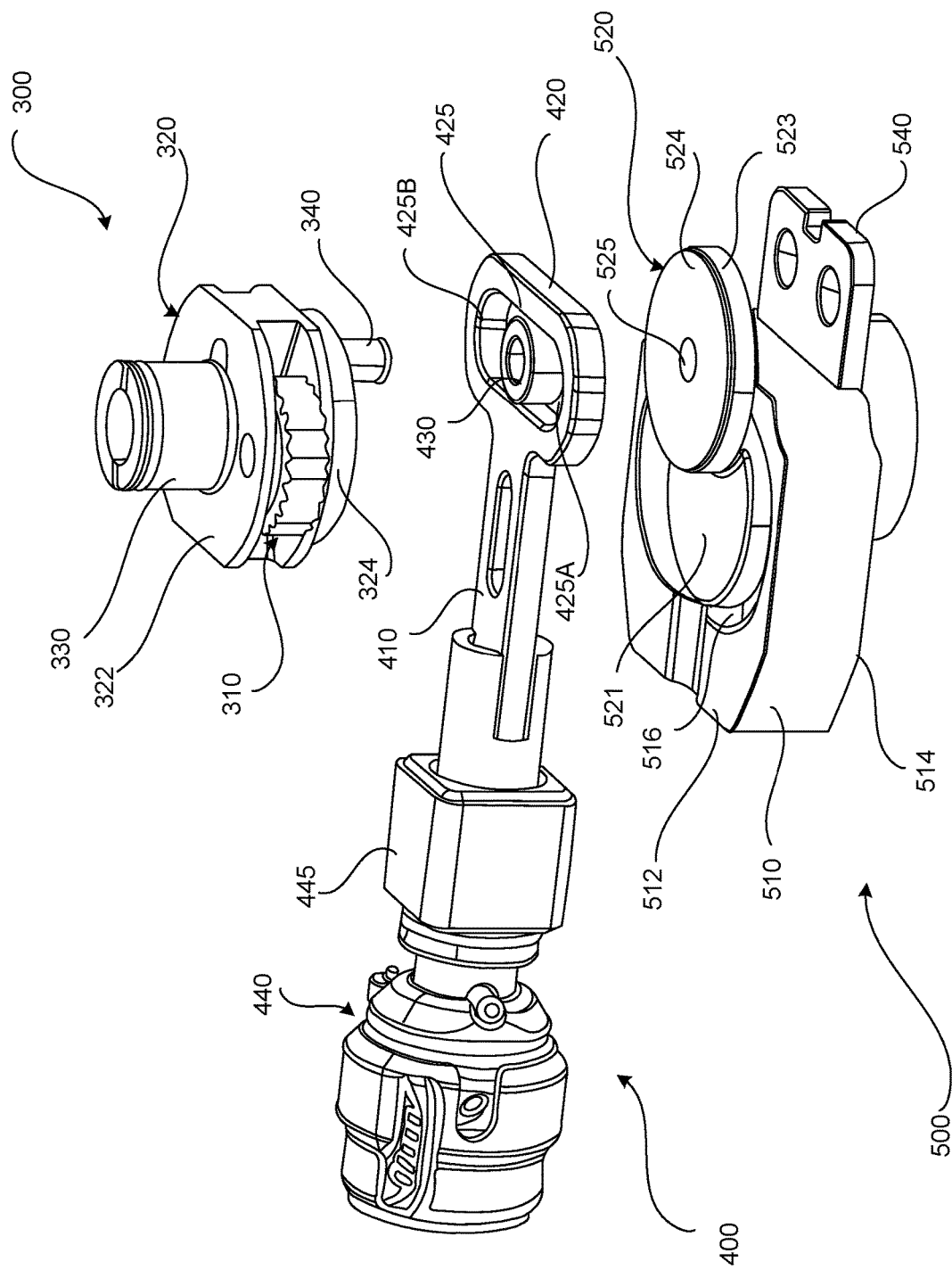
FIG. 5B is an exploded perspective view of the exemplary transmission mechanism, the exemplary reciprocating mechanism, and the exemplary counterbalancing mechanism shown in FIG. 5A, in accordance with implementations described herein.
Figure 6A:
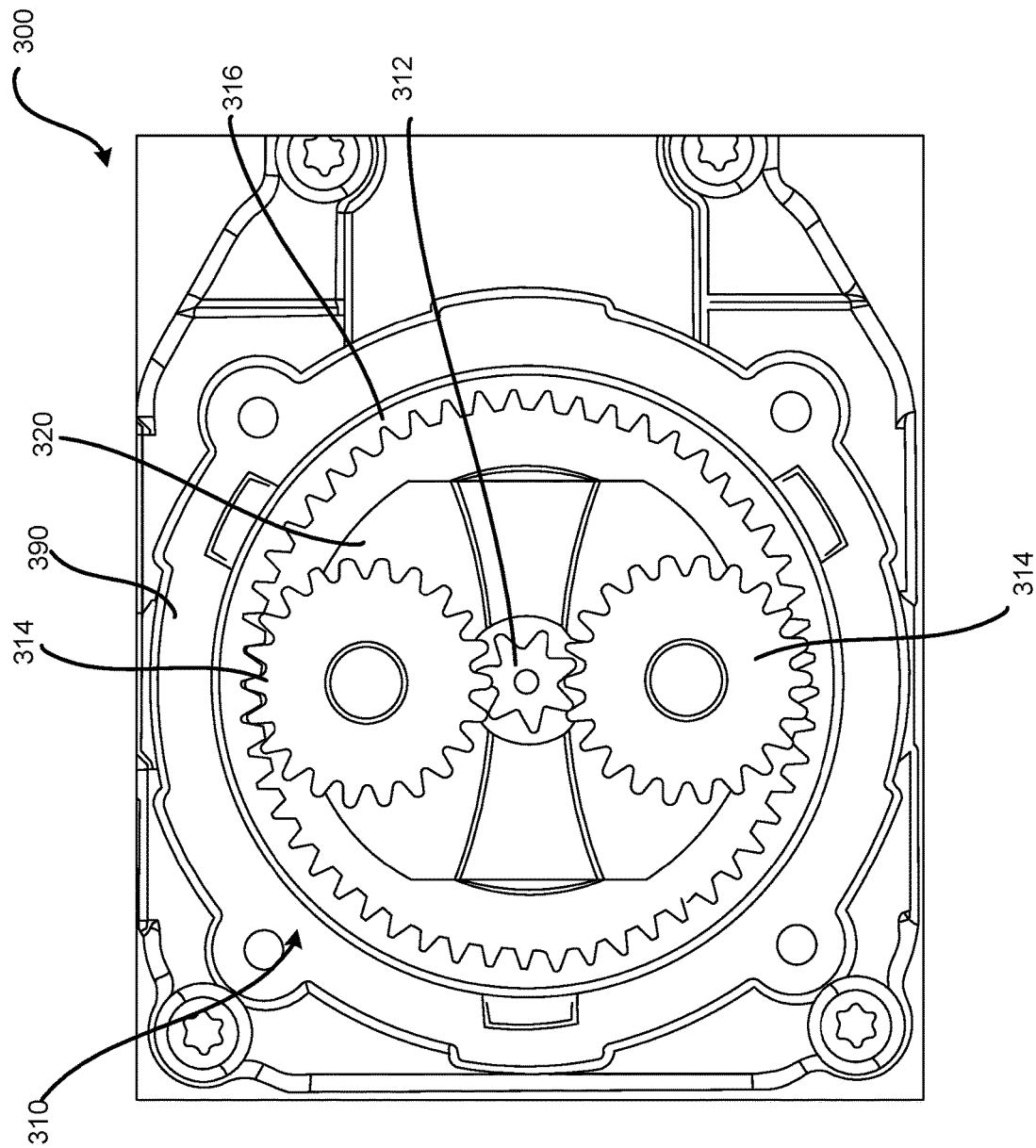
FIG. 6A is a top view of the exemplary transmission mechanism shown in FIGS. 5A and 5B, in accordance with implementations described herein.
Figure 6B:
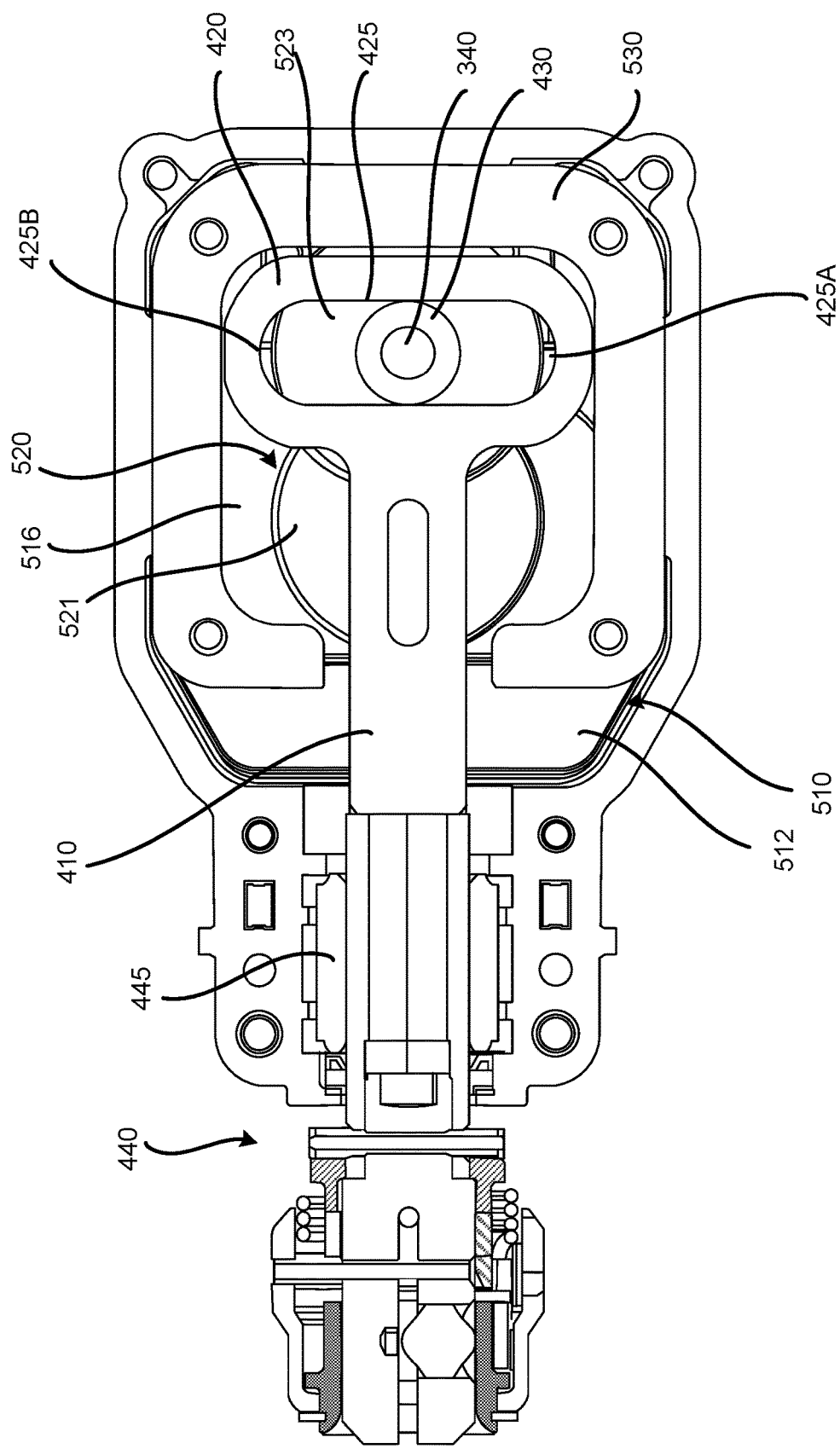
FIG. 6B is a top view of the exemplary reciprocating mechanism shown in FIGS. 5A and 5B, in accordance with implementations described herein.
Figure 6C:
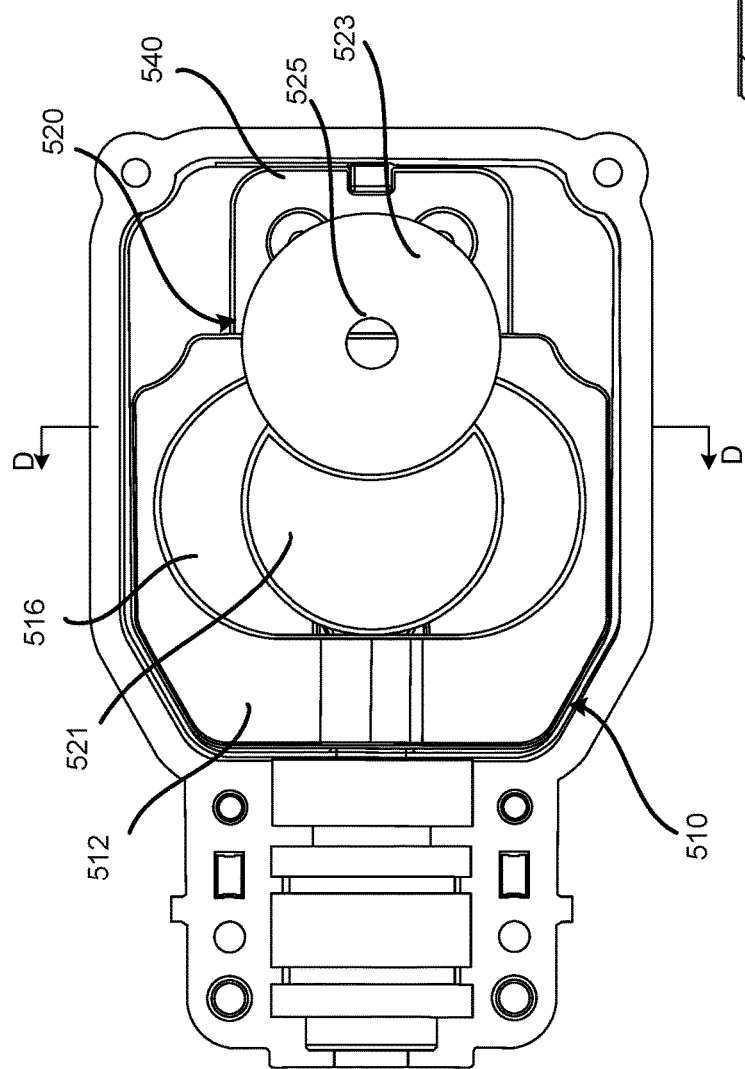
FIG. 6C is a top view of the exemplary counterbalancing mechanism shown in FIGS. 5A and 5B, in accordance with implementations described herein.
Figure 6D:
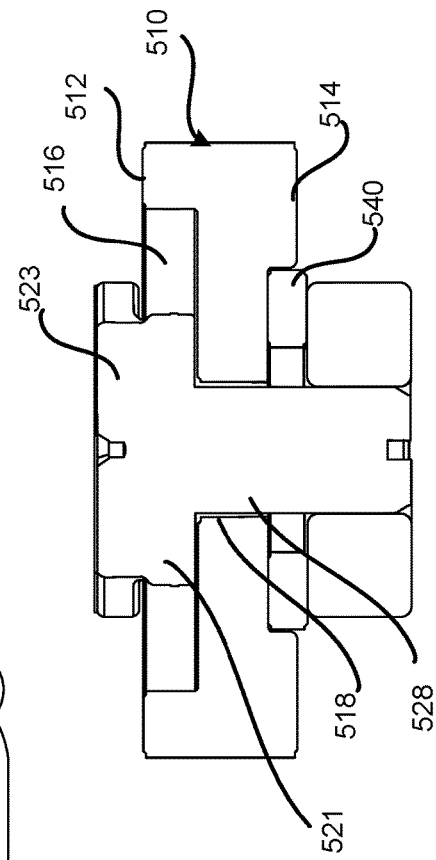
FIG. 6D is a cross sectional view of the assembled transmission mechanism, reciprocating mechanism, and counterbalancing mechanism, in accordance with implementations described herein.

FIG. 5A is a cross-sectional view taken along line A-A of FIG. 2B, and FIG. 5B is an exploded perspective view, of the exemplary transmission mechanism 300, the exemplary reciprocating mechanism 400, and the exemplary counterbalancing mechanism 500, of the exemplary tool 200 shown in FIGS. 2A-4. FIG. 6A is a top view of the exemplary transmission mechanism 300, with a portion of a housing removed so that internal components of the transmission mechanism 300 are visible, in accordance with implementations described herein. FIG. 6B is a top view of the reciprocating mechanism 400, and FIG. 6C is a top view of the counterbalancing mechanism 500, in accordance with implementations described herein. FIG. 6D is a cross sectional view of the assembled transmission mechanism 300, reciprocating mechanism 400, and counterbalancing mechanism 500, taken along line B-B of FIG. 2B, in accordance with implementations described herein.

As shown in FIGS. 5A, 5B and 6A, in some implementations, the transmission mechanism 300 may be received in a housing 390. A planetary gear assembly 310, arranged in a carrier 320, may be positioned in the housing 390, aligned with the motor 210. The planetary gear assembly 310 may include a central gear (also referred to as a sun gear) 312 and one or more planet gears 314 in meshed engagement with the sun gear 312. An outer gear 316 may be in meshed engagement with the one or more planet gear(s) 314. An output shaft 212 of the motor 210 may extend through a bushing 330 on an upper portion 322 of the carrier 320, and into the gear assembly 310, so that an end portion of the output shaft 212 of the motor 210 may be engaged with the sun gear 312. The rotational force of the motor 210, output via the output shaft 212, rotates the sun gear 312, which in turn rotates the one or more planet gear(s) 314 coupled on the carrier 320. Due to the meshed engagement of the planet gears 314 with the outer gear 316, the rotation of the planet gears 314 causes the carrier 320 to rotate about the sun gear 312. A pin 340 may extend downward, from a lower portion 324 of the carrier 320. The pin 340 may be fixed to, or integrally formed with, the carrier 320, such that the pin 340 rotates together with the carrier 320 about the sun gear 312. As shown in FIG. 5A, the output shaft 212 of the motor 210, the carrier 320 and the sun gear 312 are all aligned along and rotate about an axis C1. The pin 340, fixed to the carrier 320, is aligned along an axis C2, offset from the axis C1, and revolves about the axis C1. Engagement of the pin 340 with the reciprocating mechanism 400 may drive reciprocating movement of a reciprocating shaft 410, which may in turn drive reciprocating movement of an output mechanism, or accessory, such as, for example, a blade, coupled to the reciprocating mechanism 400

The use of the exemplary planetary gear assembly 310 in the power-driven reciprocating tool 200, in accordance with implementations described herein, may provide for a relatively compact mechanism to transmit force from the motor 210 to an output mechanism of the tool 200 during operation. The relatively compact transmission mechanism 300 may, in turn, reduce an overall size, or profile of the tool 200. For example, in some implementations, an overall size, or dimension, or profile, of the tool 200 in a longitudinal direction L, or a longitudinal axis L, of the tool 200 (see FIG. 2), may be reduced. In some implementations, an overall size, or dimension, or profile, of the tool 200 in a height direction H of the tool 200 may be reduced. The relatively compact tool profile afforded by the user of the planetary gear assembly 310 may provide for improve user control of the tool and may allow the user to work in and access smaller, more confined spaces using the tool 200.

As shown in FIGS. 5A, 5B, 6B and 6D, the reciprocating mechanism 400 may include a reciprocating shaft 410. A yoke 420 may be positioned at a first end of the reciprocating shaft 410, and a coupling device 440 may be positioned at a second end of the reciprocating shaft 410. The coupling device 440 may detachably couple, for example, an accessory such as, for example, a blade, to the reciprocating mechanism 400. A bushing 430 may be received in a slot 425 formed in the yoke 420. The bushing 430 may be movable, for example, slidable, within the slot 425. The pin 340 may be coupled in the bushing 430, thereby coupling the transmission mechanism 300 to the reciprocating mechanism 400.

As shown in FIGS. 5A, 5B, 6C and 6D, the counterbalancing mechanism 500 may include a counterbalance member (also referred to as a weight) 510. An eccentric member 520, for example, a dual eccentric counter-stroke cam 520, may be coupled to the counterbalance member 510. The pin 340 may extend through the bushing 425 received in the yoke 420, and into an opening 525 formed in the eccentric member 520. In some implementations, the eccentric member 520 may be movably coupled, for example, rotatably coupled to an upper portion 512 of the counterbalance member 510. In the exemplary implementation illustrated in FIGS. 5A and 5B, the eccentric member 520 (or a first eccentric counter-stroke cam 520) includes a first portion 521 (or a first eccentric counter-stroke disc 521) that is rotatably coupled to the counterbalance member 510, and a second portion 523 (or a second eccentric counter-stroke disc 523) in which the opening 525 is formed to receive the pin 340. In some implementations, a shaft 528 extending from the eccentric member 520 may be rotatably coupled in a corresponding recess 518 in the counterbalance member 510 to rotatably couple the eccentric member 520 to the counterbalance member 510. In some implementations, the first portion 521 of the eccentric member 520 may be received in a recess 516 formed in the upper portion 512 of the counterbalance member 510, with the first portion 521 coupled to a lower portion of the second portion 523, at an offset from the second portion 523 of the eccentric member 520. In some implementations, a shape, or internal contour, of the recess 516 may correspond to a shape, or external contour, of the first portion 521 of the eccentric member 520. In some implementations, the eccentric member 520 may be substantially planar, with a first end portion thereof being rotatably coupled to the upper portion 512 of the counterbalance member 510, and a second end portion thereof having the opening 525 formed therein. In some implementations, a wear plate (also referred to as a washer) 524, may be positioned on an upper surface of the second portion 523 of the eccentric member 520.

The engagement of the pin 340, through the bushing 430 and into the opening 525 of the eccentric member 520, may in turn cause the eccentric member 520 to revolve, and may convert the rotational force (generated by the motor 210) to a linear force output by the reciprocating mechanism 400. The engagement of the pin 340 with the eccentric member 520 in this manner may also cause linear motion of the counterbalance member 510, for example, linear motion of the counterbalance member 510 that is opposite the linear motion of the reciprocating mechanism 400, to balance the linear motion of the reciprocating mechanism 400. The balancing of the linear motion of the reciprocating mechanism 400 in this manner may reduce or substantially eliminate vibration due to the reciprocating forces generated during operation of the tool 200. This will be described in more detail with respect to FIGS. 7A-7D.

FIGS. 7A-7D are top views of the reciprocating mechanism 400 and the counterbalancing mechanism 500 in phased operation, in accordance with implementations described herein. In particular, in the exemplary arrangement shown in FIGS. 7A-7D, the components of the reciprocating mechanism 400 and the counterbalancing mechanism 500 are shown at 0 degrees (FIG. 7A), 90 degrees (FIG. 7B), 180 degrees (FIG. 7C), and 270 degrees (FIG. 7D) in response to the rotational output force from the motor 210, as described above.

Figure 7A:
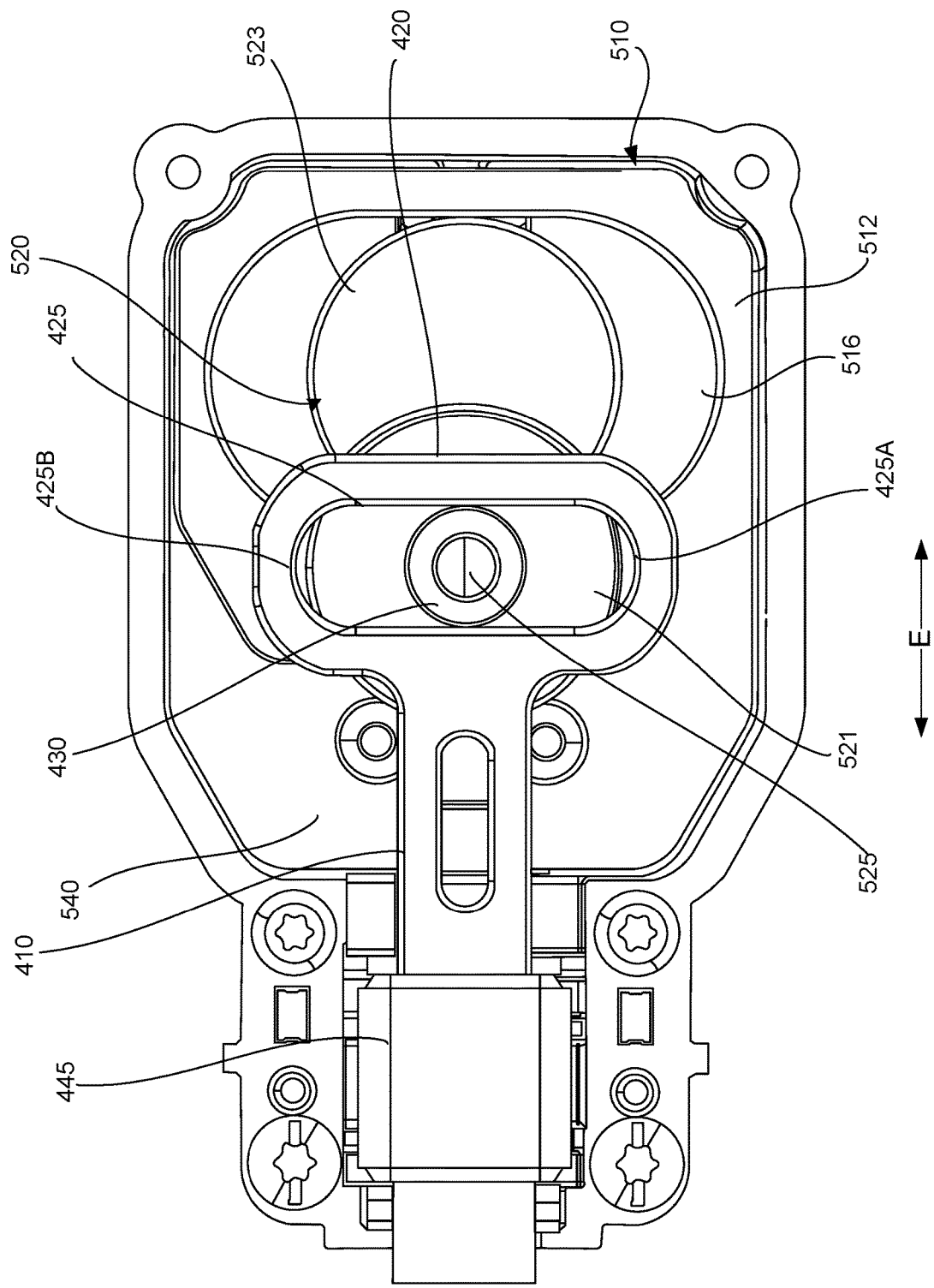

As shown in FIG. 7A, at 0 degrees, the pin 340 (not shown but received in the bushing 430), is positioned at an intermediate position in the slot 425, between a first end 425A of the slot 425 and a second end 425B of the slot 425. The 0-degree phase position shown in FIG. 7A may represent a first linear position (for example, a first extreme of travel of the reciprocating shaft 410/yoke 420, or maximum linear position) of the reciprocating shaft 410 along a linear reciprocating direction E, or a linear axis E. For example, in the arrangement and orientation illustrated in FIG. 7A, the reciprocating shaft 410 is in a far-left position along the linear reciprocating direction E, and the counterbalance member 510 is in a far-right position along the linear reciprocating direction E. With the reciprocating shaft 410 in the first position, the counterbalance member 510 may be positioned to balance the movement of the reciprocating shaft 410. The first position of the reciprocating shaft 410 shown in FIG. 7A may represent a first linear position, or a most extended position, or a first extreme of travel of the reciprocating shaft 410/yoke 420, or a maximum linear position, of the reciprocating shaft 410 along the linear reciprocating direction E.

Figure 7B:
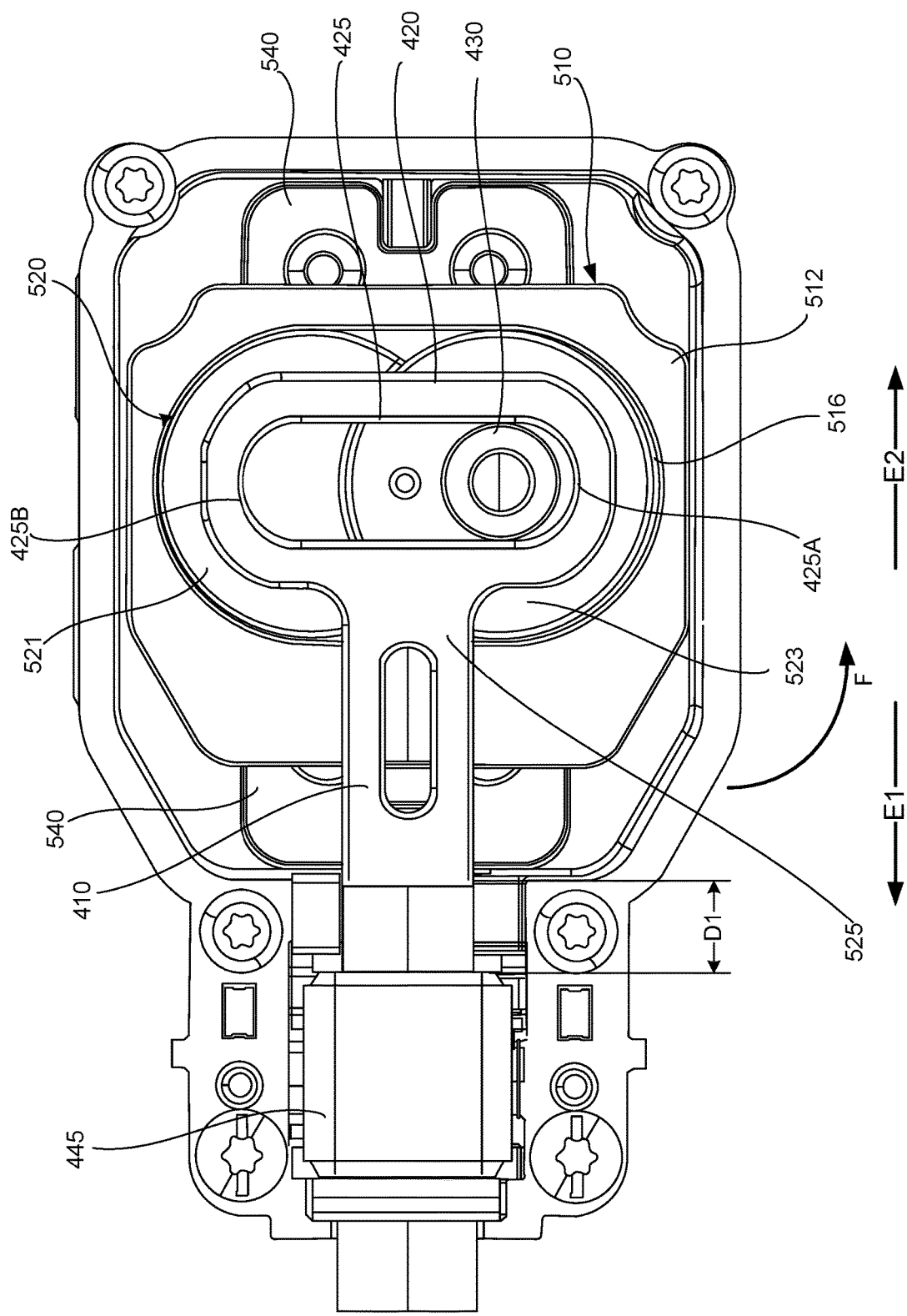

Rotation of the output shaft 212 of the motor 210 causes the carrier 320 to rotate and causes the pin 340 to move together with the carrier 320, as described above with respect to FIGS. 5A, 5B and 6A such that the pin 340 revolves around the axis C1 of the motor output shaft 212. As illustrated in FIGS. 7A and 7B, because the pin 340 (not shown but received in the bushing 430 and into the opening 525 in the eccentric member 520), this revolving movement of the pin 340 causes a corresponding movement of the eccentric member 520, for example, in the direction of the arrow F. In moving from the 0 degree phase position shown in FIG. 7A to the 90 degree phase position shown in FIG. 7B, the eccentric member 520 (and the position of the pin 340 received in the opening 525) has rotated approximately 90 degrees about the axis C1, positioning the pin 340/bushing 430 at the second end 425B of the slot 425, and causing the reciprocating shaft 410 to move linearly by a distance D1, in the linear reciprocating direction E2, from the 0 phase position shown in FIG. 7A. The 90-degree phase position shown in FIG. 7B may represent an intermediate linear position of the reciprocating shaft 410. The movement of the pin 340/bushing 430 and eccentric member 520 in this manner may also cause the counterbalance member 510 to move linearly, in the direction E1, opposite the linear movement of the reciprocating shaft 410, to an intermediate linear position, thus balancing the movement of the reciprocating mechanism 400.

Continued rotation of the output shaft 212 of the motor 210 in the direction of the arrow F, and corresponding movement of the carrier 320 and the pin 340 as described above, causes a corresponding movement of the eccentric member 520, from the 90-degree phase position shown in FIG. 7B, to the 180-degree phase position shown in FIG. 7C. In the 180-degree phase position, the eccentric member 520 (and the position of the pin 340 received in the opening 525) has rotated an additional approximately 90 degrees (from the 90 degree phase position shown in FIG. 7B) about the axis C1, positioning the pin 340/bushing 430 at the intermediate portion of the slot 425, and causing the reciprocating shaft 410 to have moved linearly, in the direction E2, by a distance D2 from the 0 phase position of FIG. 7A. The 180-degree phase position shown in FIG. 7C may represent a second linear position (i.e., a second extreme of travel of the reciprocating shaft 410/yoke 420, opposite the first extreme of travel of the reciprocating shaft/yoke, or a minimum linear position, or a most withdrawn linear position) of the reciprocating shaft 410 along the linear reciprocating direction E. The movement of the pin 340/bushing 430 and eccentric member 520 in this manner may also cause the counterbalance member 510 to move linearly, in the direction E1, opposite the linear movement of the reciprocating shaft 410, to a second linear position, thus balancing the movement of the reciprocating mechanism 400.

Figure 7D:
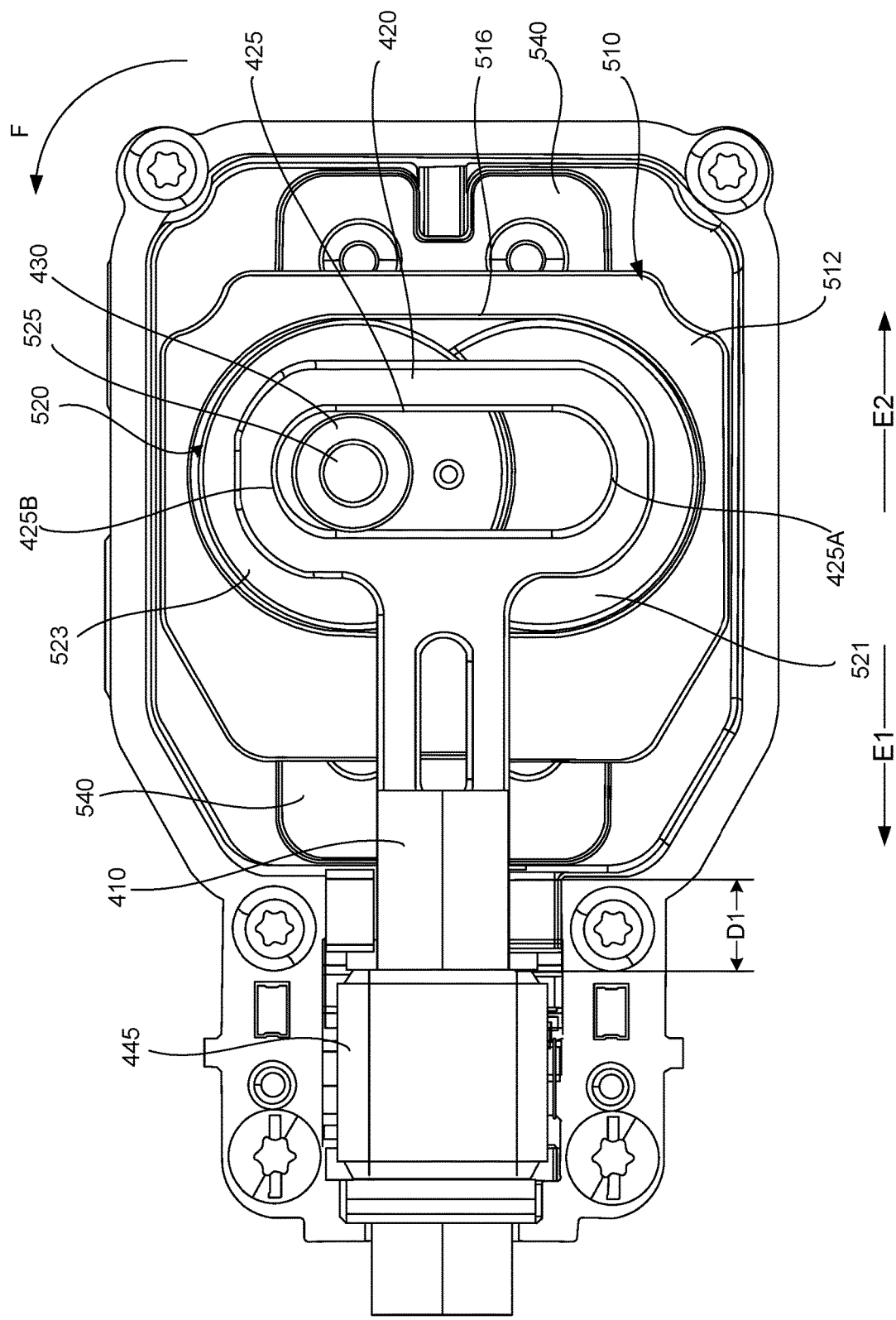

Continued rotation of the output shaft 212 of the motor 210 in the direction of the arrow F and corresponding movement of the carrier 320 and the pin 340 causes a corresponding movement of the eccentric member 520, from the 180-degree phase position shown in FIG. 7C, to the 270-degree phase position shown in FIG. 7D. In the 270 degree phase position, the eccentric member 520 (and the position of the pin 340 received in the opening 525) has rotated an additional approximately 90 degrees (from the 180-degree phase position shown in FIG. 7C) about the axis C1, positioning the pin 340/bushing 430 at the second end 425B of the slot 425, and causing the reciprocating shaft 410 to have moved linearly, in the direction E1, once again at a distance D1 from the 0 phase position. The 270-degree phase position shown in FIG. 7C may represent an intermediate linear position of the reciprocating shaft 410. The movement of the pin 340/bushing 430 and eccentric member 520 in this manner may also cause the counterbalance member 510 to move linearly, in the direction E2, opposite the linear movement of the reciprocating shaft 410, to an intermediate linear position as shown in FIG. 7D, thus balancing the movement of the reciprocating mechanism 400.

Continued rotation of the output shaft 212 of the motor 210, the corresponding movement of the carrier 320/pin 340 and the eccentric member 520 coupled thereto, as described above, may produce continued reciprocating movement of the reciprocating mechanism 400, and opposite reciprocating movement of the counterbalance member 520. The opposing reciprocating movement of the reciprocating mechanism 400 and the counterbalancing mechanism 500 along the linear axis E may be substantially orthogonal to the linear movement of the pin 340 within the slot 425 formed in the yoke 420 of the reciprocating mechanism 400.

In some implementations a bushing 445 positioned at a distal end of the reciprocating shaft 410, for example, proximate the coupling device 440, may support and guide the linear reciprocating movement of the reciprocating shaft 410. In some implementations, a first guide plate 530 may be positioned at an upper portion 512 of the counterbalance member 510 to guide the linear reciprocating movement of the reciprocating mechanism 400. In particular, the first guide plate 530 may be shaped so as to guide the linear reciprocating movement of the yoke 420, as the eccentric member 520 rotates and the pin 340/bushing 430 moves in the slot 425, as described above. In some implementations, the size and/or the shape of the first guide plate 530 may restrict, or limit, a linear position of the yoke 420, thus restricting, or limiting, further reciprocating movement of the reciprocating mechanism 400 beyond a set position. In some implementations, a second guide plate 540 may be positioned at a lower portion 514 of the counterbalance member 510 to guide the reciprocating movement of the counterbalance member 510. In some implementations, the second guide plate 540 may be received in a recess formed in the lower portion 514 of the counterbalance member 510, the recess having an internal contour corresponding to the external contour of the second guide plate 540 so as to guide the linear movement of the counterbalance member 510, as shown in the exemplary implementation illustrated herein.

Linear reciprocating motion the counterbalancing mechanism 500 that is opposite to the linear reciprocating motion of the reciprocating mechanism 400, in the manner described above with respect to FIGS. 7A through 7D, may counter-balance the forces generated due to the conversion of the rotational force generated by the motor to a linear force to be output by the tool, and the reciprocating motion of the reciprocating mechanism 400. The counter-balancing of these forces reduces vibratory forces output by the tool. Reduced vibration allows for more precise operation and control of the tool, and reduces user fatigue, thus enhancing utility of the tool.

Figure 8A:
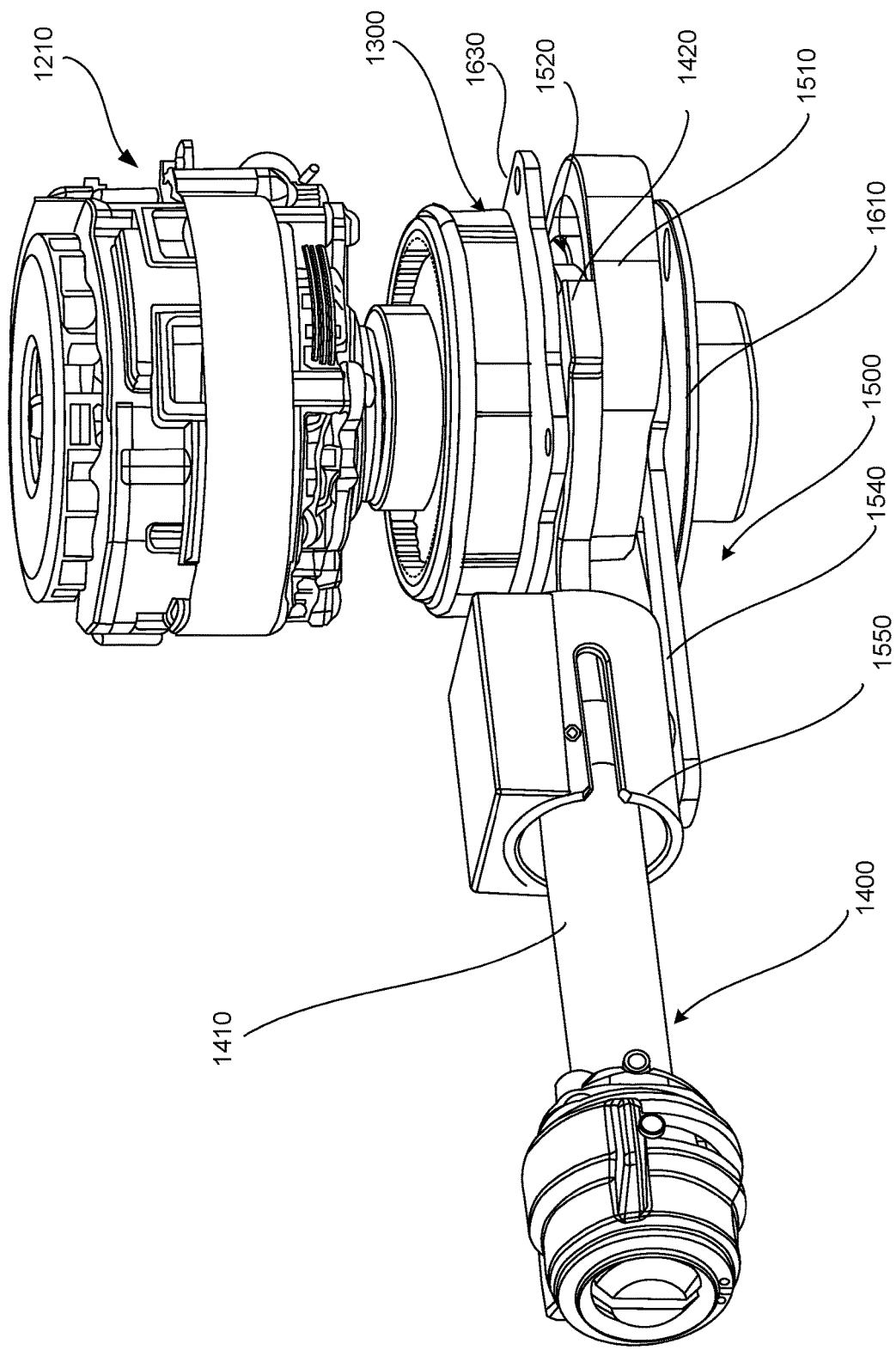
FIG. 8A is an assembled perspective view.
Figure 8B:
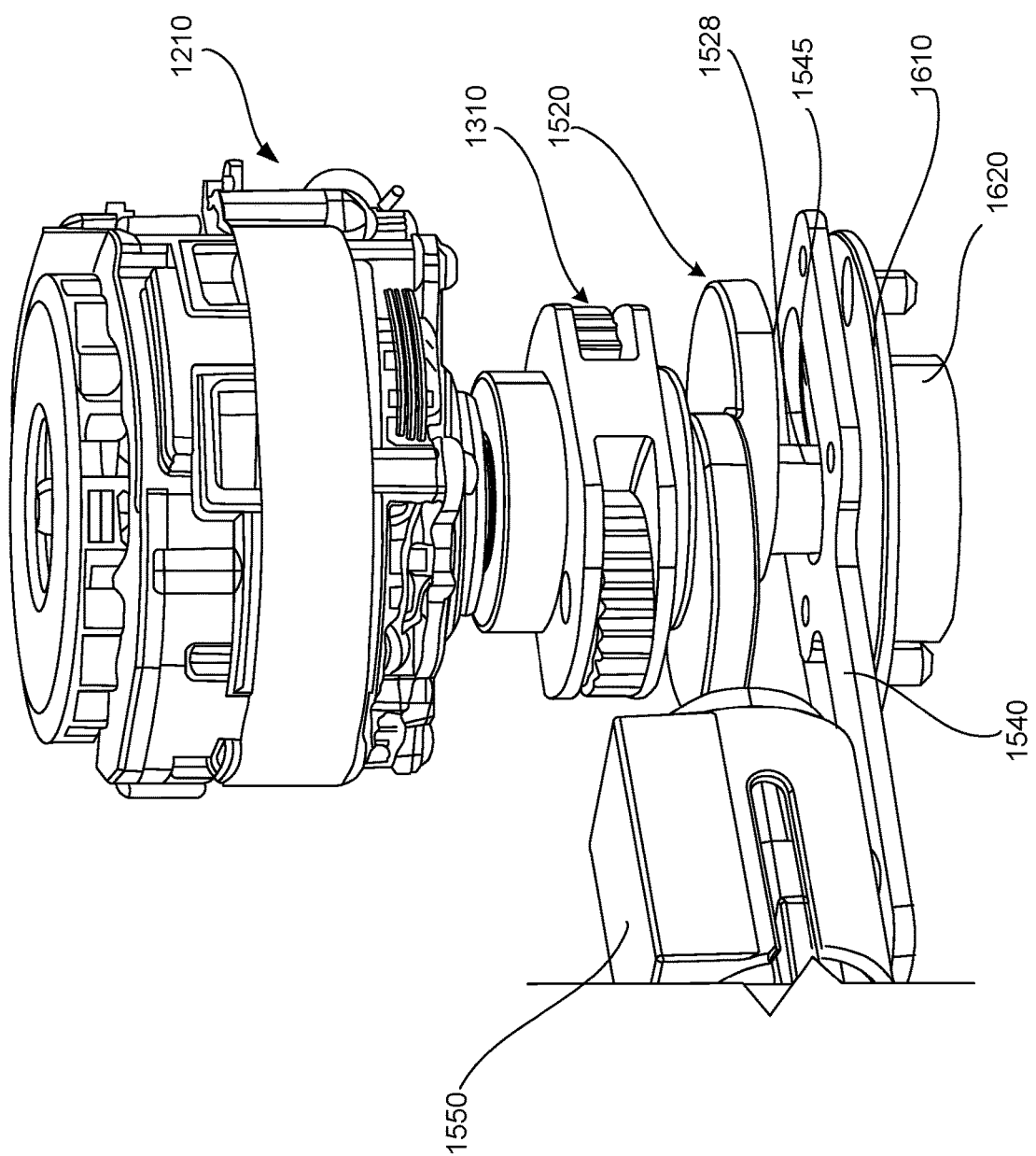
FIG. 8B is a perspective view, of a transmission mechanism, a reciprocating mechanism, and a counterbalancing mechanism for a power-driven reciprocating tool, in accordance with implementations described herein.

FIGS. 8A and 8B illustrate a motor 1210, a transmission mechanism 1300, a reciprocating mechanism 1400, and a counterbalancing mechanism 1500 for a power-driven reciprocating tool, in accordance with implementations described herein. In the exemplary implementation shown in FIGS. 8A and 8B, the reciprocating mechanism 1400 and the counterbalancing mechanism 1500 move in opposite linear directions to each other, through the action of a dual eccentric counter-stroke cam, such that the counterbalancing mechanism 1500 counter-balances the action of the reciprocating mechanism 1400. In the exemplary implementation illustrated in FIGS. 8A and 8B, at least a portion of the counterweighting provided by the counterbalancing mechanism 1500 is provided inline with the linear reciprocating action of the reciprocating mechanism 1500, achieving a reduction in vibration output by the tool with a relatively compact system.

FIG. 8A is an assembled perspective view, and FIG. 8B is an assembled perspective view with certain elements from FIG. 8A removed, of the motor 1210, the transmission mechanism 1300, the reciprocating mechanism 1400, and the counterbalancing mechanism 1500, in accordance with implementations described herein. The motor 1210 may be positioned inline with the transmission mechanism 1300, including a planetary gear assembly 1310, so that an output shaft of the motor 1210 may drive the planetary gear assembly 1310, in a manner similar to that described above with respect to FIGS. 5A and 5B. The planetary gear assembly 1310 may, in turn, be arranged inline with the reciprocating mechanism 1400. In particular, the planetary gear assembly 1310 may be arranged inline with, and coupled to, a dual eccentric stroke cam (also referred to as an eccentric member) 1520, to in turn drive a reciprocating shaft 1410 of the reciprocating mechanism 1400. A first counterweight member 1510 and a second counterweight member 1550 may be fixed to opposite end portions of a connecting plate 1540, such that the first counterweight 1510, the second counterweight 1550, and the connecting plate 1540 move together. A shaft 1528 of the eccentric member 1520 extends through an elongated slot 1545 in the connecting plate 1540 and may be retained by a first plate 1610 and a bearing 1620 positioned below the connecting plate 1540. In FIG. 8B, the reciprocating shaft 1410 and a first counterweight member 1510 have been removed, for illustrative purposes, so that the inline arrangement of the planetary gear assembly 1310, the eccentric member 1520, and the bearing 1620 is visible.

Figure 9A:
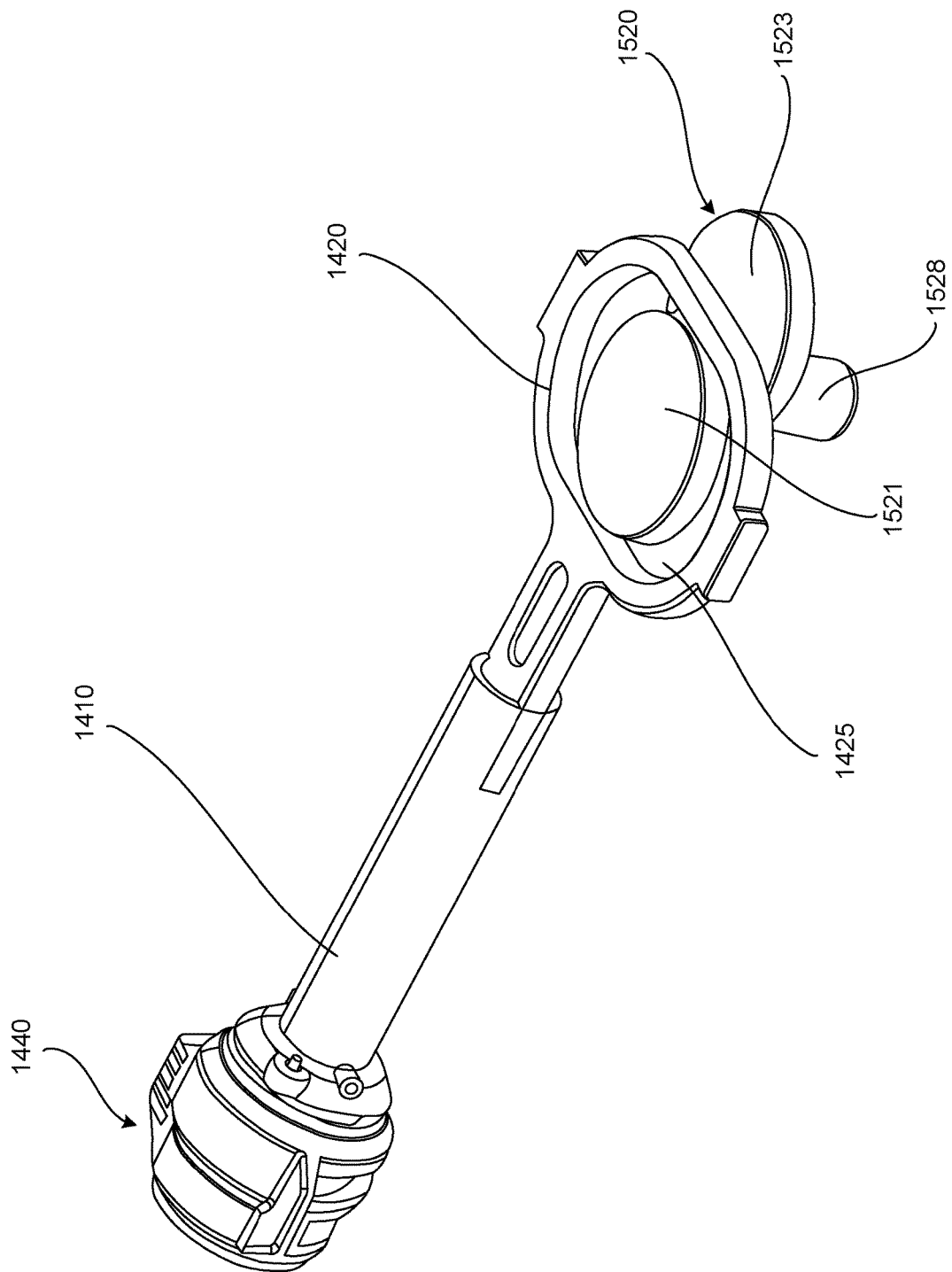
FIG. 9A is a perspective view of the reciprocating mechanism shown in FIGS. 8A and 8B, in accordance with implementations described herein.
Figure 9B:
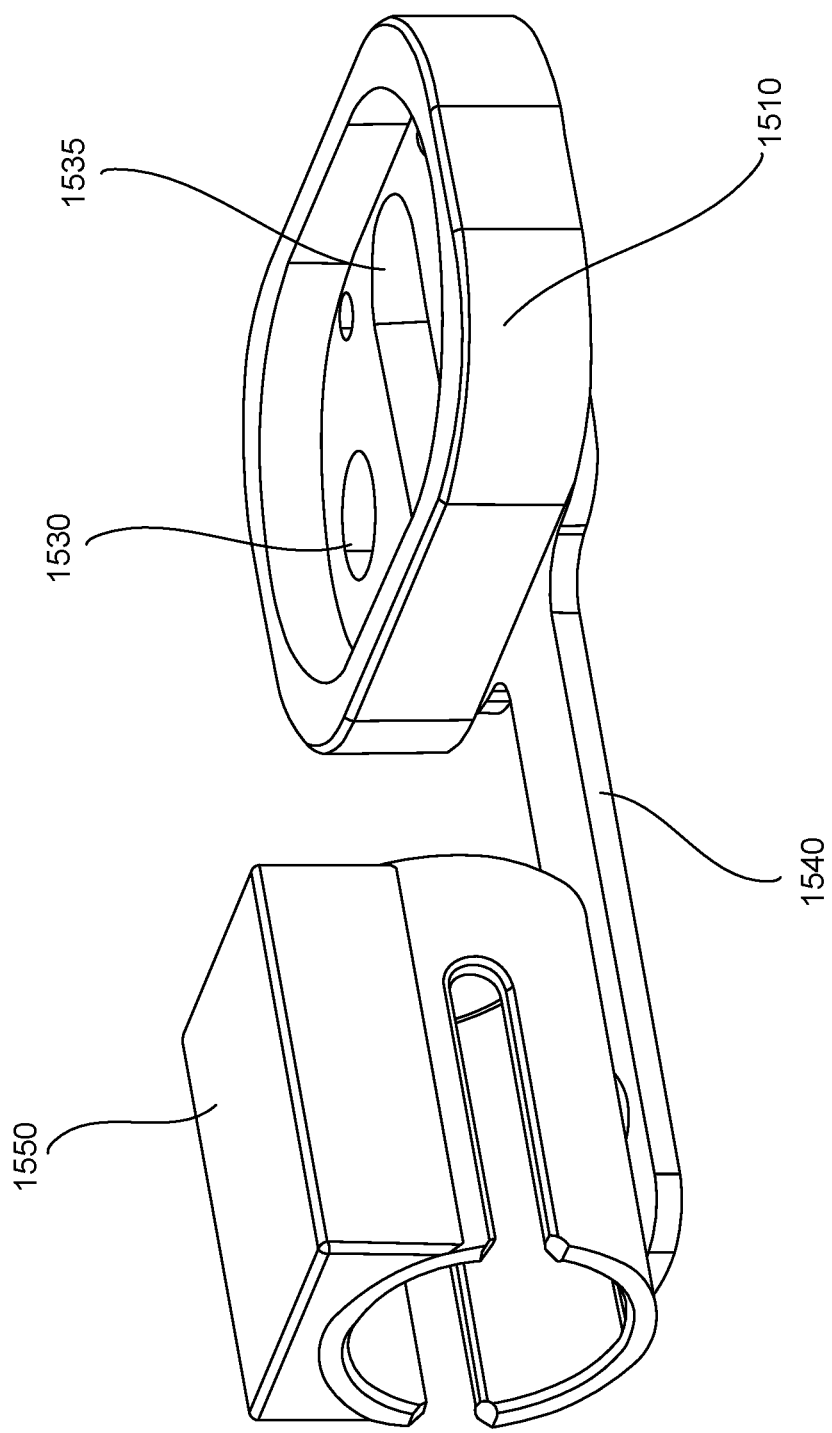
FIG. 9B is a perspective view of the counterbalancing mechanism shown in FIGS. 8A and 8B, in accordance with implementations described herein.
Figure 9C:
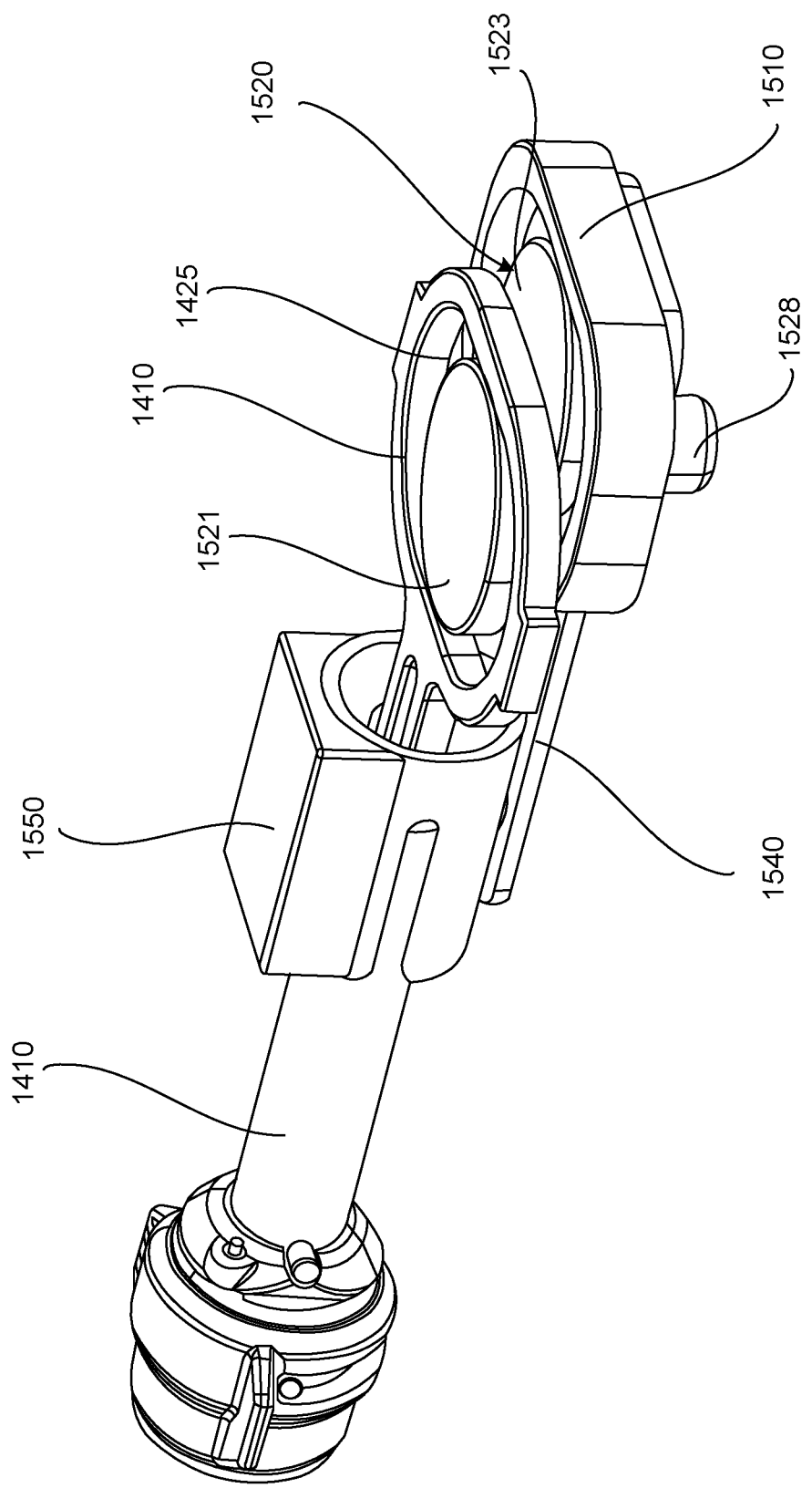
FIG. 9C is a perspective view of the reciprocating mechanism coupled with the counterbalancing mechanism shown in FIGS. 8A and 8B, in accordance with implementations described herein.

FIG. 9A is a perspective view of the reciprocating mechanism 1400, FIG. 9B is a perspective view of the counterbalancing mechanism 1500, and FIG. 9C is a perspective view of the reciprocating mechanism 1400 engaged with the counterbalancing mechanism 1500.

As shown in FIG. 9A, the reciprocating mechanism 1400 may include a yoke 1420 at a first end of the reciprocating shaft 1410, and a coupling device 1440 at a second end of the reciprocating shaft 1410, for coupling an external tool accessory to the reciprocating mechanism 1400. A first eccentric counter-stroke disc (also referred to as a first portion) 1521 of the eccentric member 520 may be received, for example, movably or slidably received, in a slot 1425 formed in the yoke 1420. As shown in FIG. 9B, the counterbalancing mechanism 1500 may include the connecting plate 1540 having the first counterweight member 1510 fixed to a first end thereof, and a second counterweight member 1550 fixed to a second end thereof. A first opening 1530 and a second opening 1535 may be formed in the first counterweight member 1510. The shaft 1528 of the eccentric member 1520 may be movably, or slidably, received in the second opening 1535 as the shaft 1528 extends through the first counterweight member 1510, through a corresponding slot 1545 in the connecting plate 1540, through the first plate 1610, and into the bearing 1620 (see FIG. 8A).

Figure 10A:
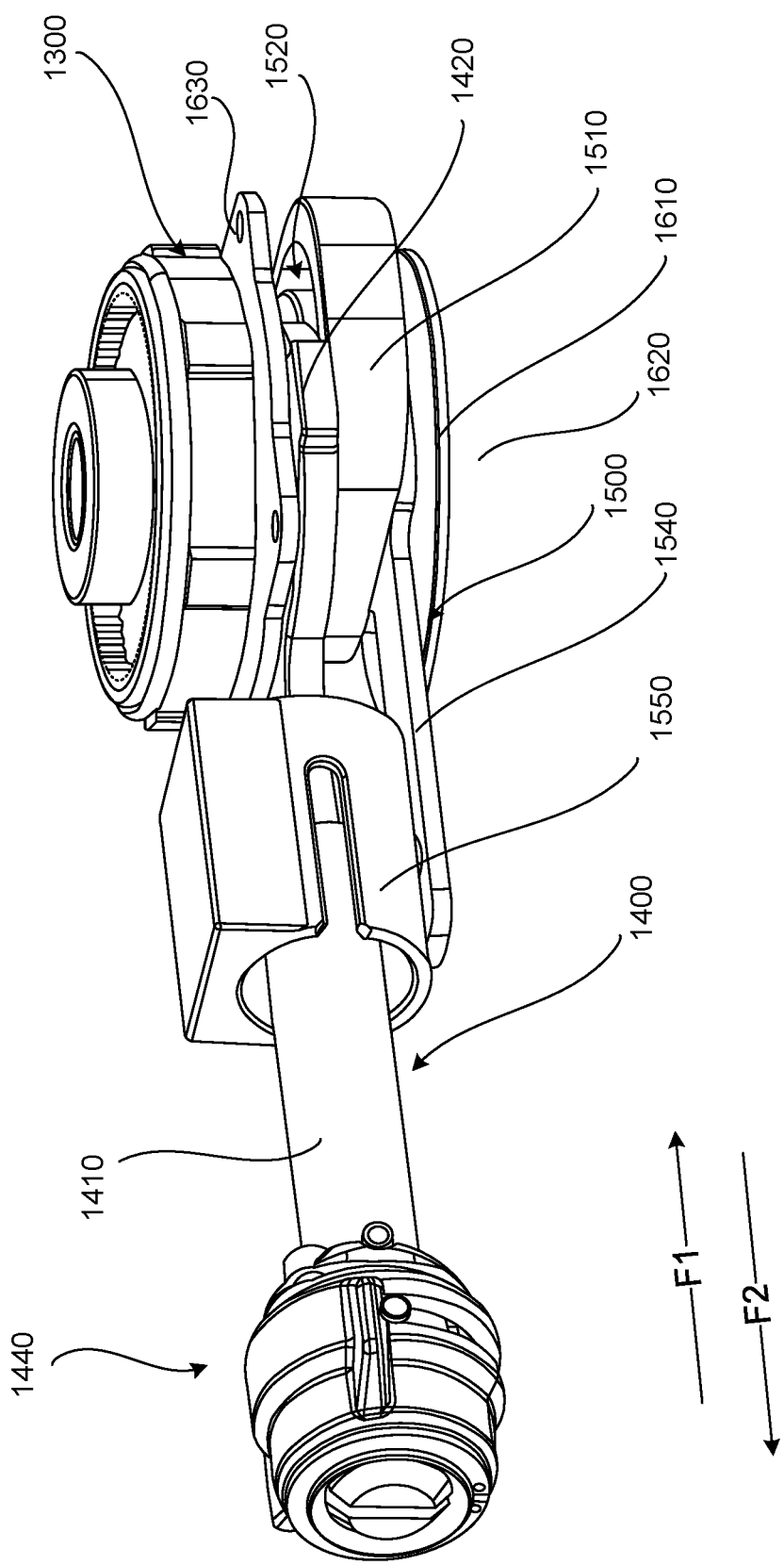
FIGS. 10A and 10B are assembled views of the transmission mechanism, the reciprocating mechanism and the counterbalancing mechanism shown in FIGS. 8A and 8B in operation, in accordance with implementations described herein.
Figure 10B:
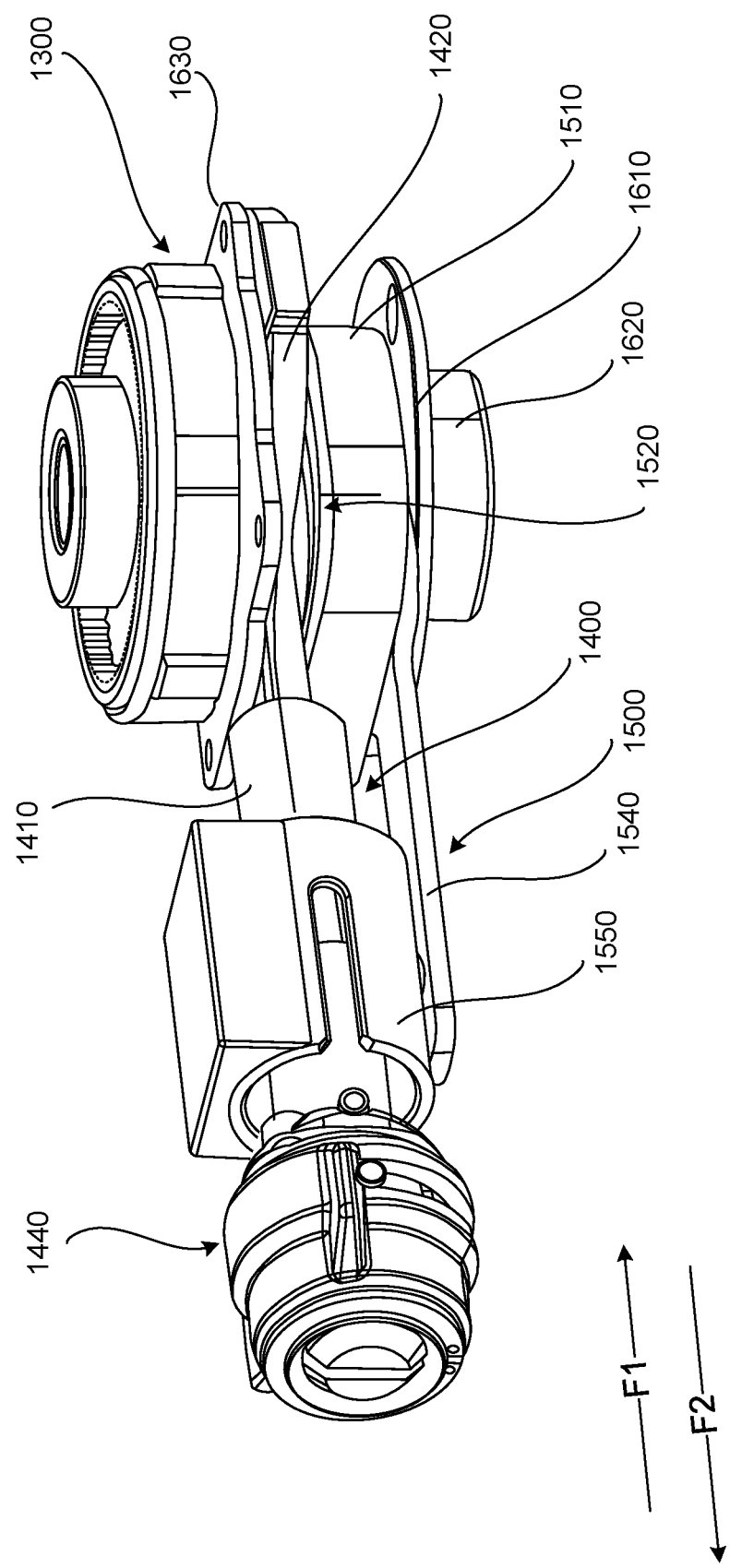

FIGS. 10A and 10B are assembled perspective views of the transmission mechanism 1300, the reciprocating mechanism 1400, and the counterbalancing mechanism 1500, in accordance with implementations described herein. In FIG. 10A, the reciprocating mechanism 1400 (the reciprocating shaft 1410 and yoke 1420) is in a first position, in which the reciprocating mechanism 1400 is in an extended, for example, a substantially fully extended state or maximum extended state, or at an extreme (maximum) end of travel. In FIG. 10A, the counterbalancing mechanism 1500 (the first counterweight member 1510, the connecting plate 1540, and the second counterweight member 1550) is in a first position, so as to counter-balance the action of the reciprocating mechanism 1500. In response to a rotational force from the motor 1210 and converted to a linear force by the transmission mechanism 1300, the reciprocating mechanism 1400 and the counterbalancing mechanism 1500 may move to respective second positions, as shown in FIG. 10B. That is, in FIG. 10B, the reciprocating mechanism 1400 has moved in a direction F1, from the first position to a second position, and the counterbalancing mechanism 1500 has moved in the direction F2, from the first position to a second position. In the second position, the reciprocating mechanism 1400 is in a rearward, or retracted state, in which the reciprocating shaft 1410 is in a minimum extended state, or at an extreme (minimum) end of travel. In the second position, the counterbalancing mechanism 1500 has moved in a direction opposite that of the reciprocating mechanism 1500, so as to counter-balance the action of the reciprocating mechanism 1500.

Figure 11A:
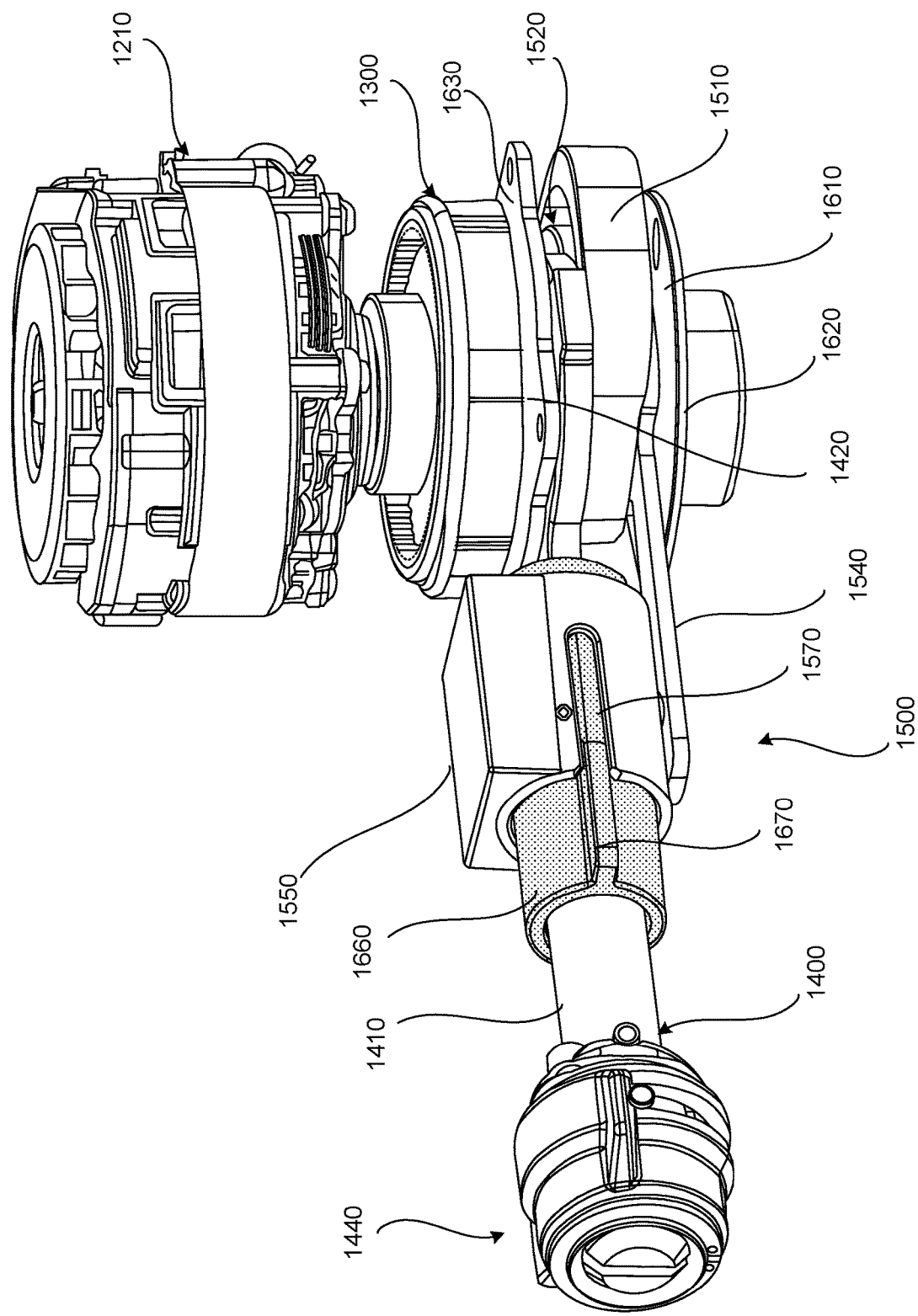
FIGS. 11A and 11B are assembled views of the transmission mechanism, the reciprocating mechanism and the counterbalancing mechanism shown in FIGS. 8A and 8B in operation, including a bearing sleeve, in accordance with implementations described herein.
Figure 11B:
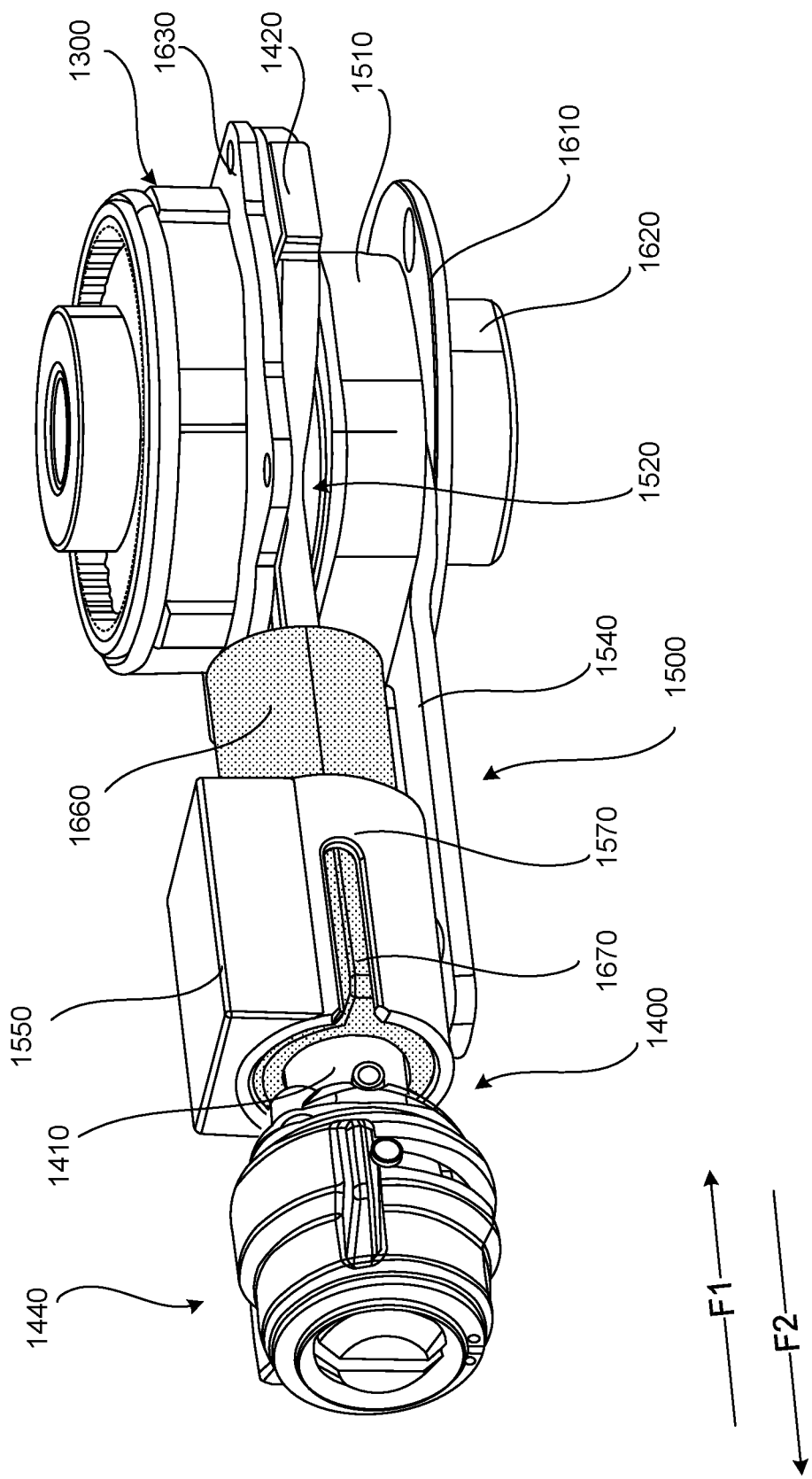

FIGS. 11A and 11B are assembled perspective views of the transmission mechanism 1300, the reciprocating mechanism 1400, and the counterbalancing mechanism 1500, including a sleeve bearing 1660, in accordance with implementations described herein. The sleeve bearing 1660 may be fitted on an outer circumferential surface of the reciprocating shaft 1410. As the reciprocating shaft 1410 reciprocates (and the counterbalancing mechanism 1500 including the second counterweight member 1550 reciprocates in a direction opposite that of the reciprocating shaft 1410) a locking tab 1670 of the sleeve bearing 1660 may move into and out of a slot 1570 formed in the second counterweight 1550 as the reciprocating mechanism 1400 and the counterbalancing mechanism 1500 move between the first and second positions shown in FIGS. 11A and 11B, respectively. Movement of the locking tab 1670 of the sleeve bearing 1660 into and out of the slot 1570 in the second counterweight member 1550, as the reciprocating mechanism 1400 and the counterbalancing mechanism 1500 exhibit complementary reciprocating motion as described, may guide and maintain a relative position of the reciprocating mechanism 1400 and the counterbalancing mechanism 1500.

In some implementations, the second counterweight member 1550 may serve as a linear guide for the linear reciprocating movement of the reciprocating shaft 1410, whether or not the sleeve bearing 1660 is included. In some implementations, features of the second counterweight member 1550 may be varied, based on, for example, an amount of counter-balancing required for a particular application, an amount of space allocated, and other such factors. For example, in some implementations, a size and/or a shape of the second counterweight member 1550 may be adapted for a particular application, to increase or decrease an amount of counterweighting provided, to fit within a particular amount of allocated space and the like. In some implementations, a mass, or a density of material of the first counterweight member 1510 and/or the second counterweight member 1550 may be varied to accommodate an amount of counterweighting provided, adapt to an amount of allocated space, and the like.

Figure 12A:
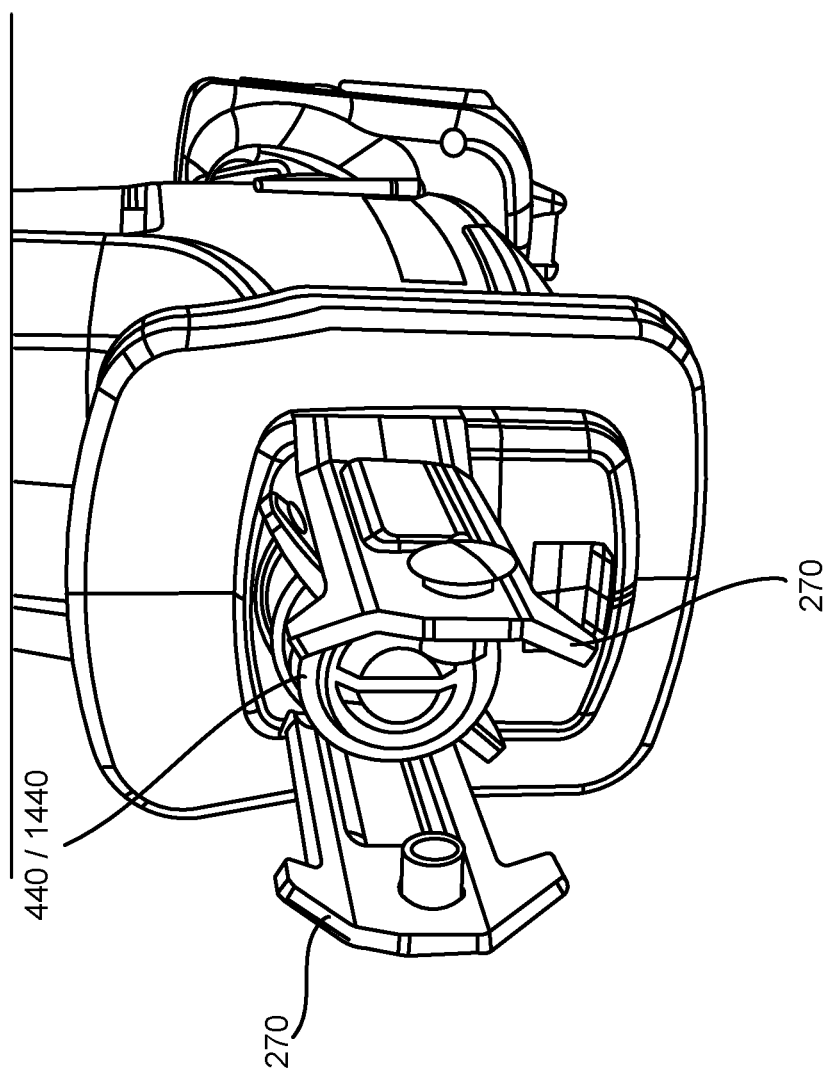
FIGS. 12A-12D illustrate an arm and shoe assembly for a power-driven tool, in accordance with implementations described herein.
Figure 12C:
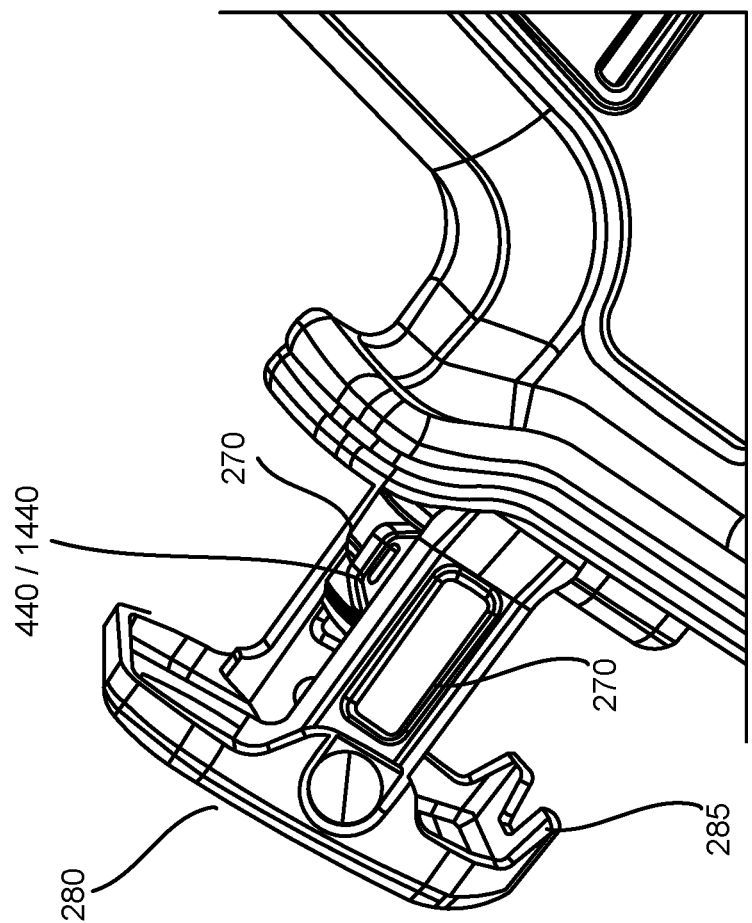
Figure 12B:
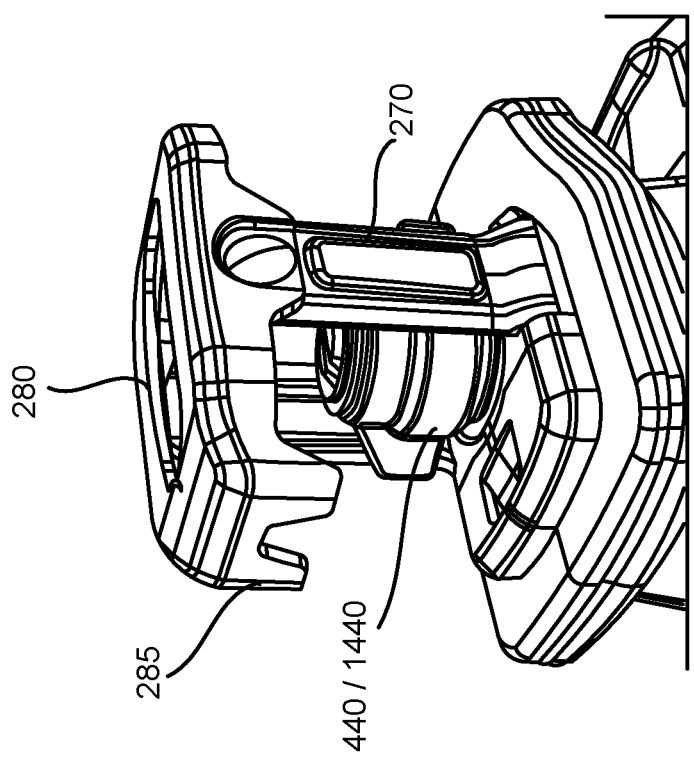
Figure 12D:
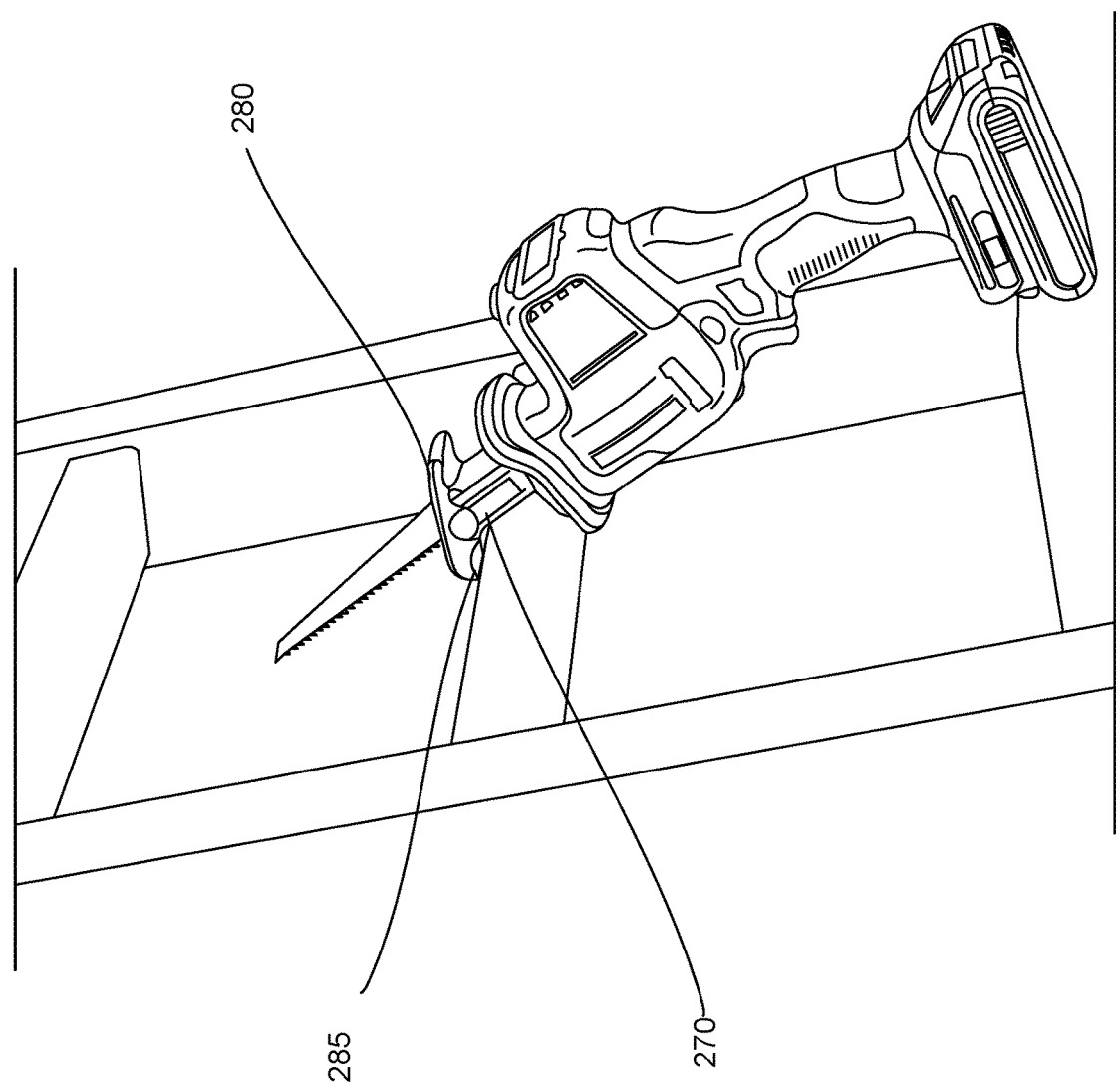

As noted above, the coupling device 440, 1440 of the tool may allow an external accessory such as, for example, a blade, to be removably attached to the tool. As shown in FIGS. 12A-12C, in some implementations, support arms 270 may be coupled to the housing 290 of the tool, and a shoe 280 may be coupled to distal ends of the support arms 270, to support a position of the accessory relative to the coupling device 440, 1440, and relative to the tool. As shown in FIG. 12A, in some implementations, a profile of the support arms 270 may be contoured, or angled, so as to be inclined toward an accessory, such as a blade, coupled to the tool. This may provide the operator an improved grip, improved accessibility, and reduced fatigue when activating, or turning, a blade release mechanism to couple and/or decouple an accessory from the coupling device 440, 1440. In some implementations, the shoe 280 may include one or more cleats 285 at an end of the shoe 280. The cleats 285 may allow an operator to temporarily suspend, or hang, or otherwise store the tool from a variety of different surfaces such as, for example, the rung of a ladder as shown in FIG. 12D, the edge of a sheet of building material, ledges, hooks, and the like. The exemplary implementation shown in FIGS. 12A-12D includes a cleat at a lower end of the shoe 280. However, in some implementations, a cleat 285 may be provided at an upper end of the shoe 280, and/or at both the upper end and the lower end of the shoe 280.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A power-driven reciprocating tool, comprising:
    a motor;
    a reciprocating mechanism; and
    a planetary gear assembly coupled between the motor and the reciprocating mechanism, the planetary gear assembly including:
        a gear carrier; and
        a pin fixed to and extending outward from a lower portion of the gear carrier such that the pin rotates together with the gear carrier in response to a rotational force from the motor,
    wherein the pin is coupled to the reciprocating mechanism, and wherein the planetary gear assembly converts the rotational force from the motor to a linear force output by the reciprocating mechanism.

2. The tool of claim 1, wherein the planetary gear assembly includes:
    a sun gear received in the gear carrier, and coupled to an output shaft of the motor so as to receive the rotational force from the motor; and
    at least one planet gear coupled in the gear carrier, and in meshed engagement with the sun gear, such that the carrier rotates in response to the rotational force from the motor.

3. The tool of claim 1, wherein the reciprocating mechanism is configured to reciprocate linearly in response to rotation of the pin.

4. The tool of claim 3, further comprising a counterbalancing mechanism coupled to the pin, wherein the counterbalancing mechanism is configured to reciprocate linearly in response to rotation of the pin, in a direction that is opposite that of the reciprocating mechanism, so as to balance the linear reciprocating movement of the reciprocating mechanism.

5. The tool of claim 1, wherein the reciprocating mechanism includes a reciprocating shaft having a yoke at an end portion thereof, wherein the pin extends through an elongated slot in the yoke so as to couple the planetary gear assembly and the reciprocating mechanism to a counterbalancing mechanism, the counterbalancing mechanism including:
    an eccentric member having an opening therein in which the pin is coupled;
    a counterbalance member; and
    a shaft extending from the eccentric member into an elongated slot in the counterbalance member so as to movably couple the counterbalance member to the eccentric member.

6. The tool of claim 5, wherein
    the pin in configured to move linearly in the elongated slot in the yoke in response to rotation of the gear carrier and the pin received in the elongated slot,
    the eccentric member is configured to revolve about the shaft in response to the linear movement of the pin in the slot,
    the reciprocating mechanism is configured to reciprocate linearly along a reciprocating axis in response to the linear movement of the pin in the slot, and
    the counterbalance member is configured to reciprocate linearly along the reciprocating axis, in a direction opposite that of the reciprocating mechanism, in response to the revolving of the eccentric member about the shaft.

7. The tool of claim 1, further comprising:
a counterbalance member; and
an eccentric member coupled to the reciprocating mechanism and to the counterbalance member,
wherein the pin is coupled in an opening formed in the eccentric member so as to couple the planetary gear assembly, the reciprocating mechanism and the counterbalance member.

8. The tool of claim 7, further comprising a bushing movably received in an elongated slot formed in the reciprocating mechanism, wherein the pin extends through the bushing, and into the opening formed in the eccentric member.

9. The tool of claim 7, wherein the eccentric member includes:
a first disc portion wherein the opening in which the pin is received is formed in the first disc portion, and the first disc portion is movably received in an elongated slot formed in the reciprocating mechanism;
a second disc portion coupled to the first disc portion such that respective central portions of the first disc portion and the second disc portion are offset; and
a shaft extending outward from the second disc portion, and into the counterbalance member so as to couple the eccentric member to the counterbalance member.

10. The tool of claim 7, wherein
the reciprocating mechanism is configured to reciprocate linearly in response to rotation of the gear carrier and the pin, and
the counterbalance member is configured to reciprocate linearly, in a direction opposite that of the reciprocating mechanism, in response to the rotation of the gear carrier and the pin.

11. The tool of claim 7, wherein the eccentric member includes:
a first disc portion having the opening formed therein in which the pin is coupled;
a second disc portion coupled to, and offset from, the first disc portion; and
a shaft extending outward, from the second disc portion, and into the counterbalance member so as to couple the eccentric member to the counterbalance member.

12. The tool of claim 11, wherein, in response to rotation of the gear carrier and pin coupled thereto,
the pin moves linearly, along a first axis, in an elongated slot formed in the reciprocating mechanism,
the second disc portion of the eccentric member revolves about the shaft,
the reciprocating mechanism reciprocates along a second linear axis, and
the counterbalance member reciprocates linearly along the second linear axis, in a direction opposite that of the reciprocating mechanism so as to balance the linear reciprocating movement of the reciprocating mechanism.

13. The tool of claim 12, wherein the first linear axis is substantially orthogonal to the second linear axis.

14. The tool of claim 11, further comprising:
a first guide plate on a first surface of the counterbalance member to guide the linear reciprocating movement of a yoke portion at a first end portion of the reciprocating mechanism;
a second guide plate on a second surface of the counterbalance member to guide the linear reciprocating movement of the counterbalance member; and
a bushing at a second end portion of the reciprocating mechanism to guide the linear reciprocating movement of a shaft portion of the reciprocating mechanism.

15. A power-driven reciprocating tool, comprising:
a motor;
a reciprocating mechanism;
a transmission mechanism coupled between the motor and the reciprocating mechanism, wherein the transmission mechanism transmits a driving force generated by the motor to the reciprocating mechanism, and the reciprocating mechanism reciprocates linearly in response to the driving force transmitted thereto by the transmission mechanism; and
a counterbalancing mechanism coupled to the transmission mechanism, wherein the counterbalancing mechanism reciprocates linearly in response to the driving force generated by the motor,
wherein a linear reciprocating direction of a counterbalance member of the counterbalancing mechanism is opposite a linear reciprocating direction of a reciprocating shaft of the reciprocating mechanism, so as to balance the linear reciprocating movement of the reciprocating mechanism.

16. The tool of claim 15, wherein the counterbalance member of the counterbalancing mechanism includes a first counterbalance member, the counterbalancing mechanism also including:
an eccentric member coupled to the transmission mechanism, the reciprocating mechanism, and the counterbalance mechanism, the eccentric member including:
a first disc portion that is fixedly coupled to the transmission mechanism;
a second disc portion that is fixedly coupled to, and offset from, the first disc portion; and
a shaft extending outward from the second disc portion and into an elongated slot in the first counterbalance member so as to movably couple the eccentric member and the first counterbalance member.

17. The tool of claim 16, wherein the counterbalancing mechanism also includes:
a second counterbalance member movably positioned on the reciprocating shaft of the reciprocating mechanism; and
a connecting plate extending in a direction corresponding to a longitudinal direction of the reciprocating shaft, wherein the first counterbalance member is fixedly coupled to a first end portion of the connecting plate, and the second counterbalance member is fixedly coupled to a second end portion of the connecting plate, such that the first counterbalance member, the connecting plate, and the second counterbalance member reciprocate together.

18. The tool of claim 17, further comprising:
a sleeve bearing fitted on an outer circumferential surface of the reciprocating shaft;
a locking tab extending radially outward from an outer surface of the sleeve bearing; and
a slot formed in the second counterbalance member, at a position corresponding to the locking tab, such that the locking tab moves into and out of the slot as the reciprocating mechanism and the counterbalancing mechanism reciprocate in opposite directions.

19. The tool of claim 17, wherein a mass of the second counterbalance member is variable, based on at least one of a size of the second counterbalance, an external shape of the second counterbalance member, or a material of the second counterbalance member.

20. The tool of claim 16, wherein the first disc portion has an opening formed therein in which an output pin of the transmission mechanism is fixedly coupled, and the first disc portion is movably received in a slot formed in a yoke of the reciprocating mechanism, such that
- the first disc portion is configured to move linearly within the slot formed in the yoke in response to rotation of the pin, and
- the first counterbalance member and the second counterbalance member are configured to reciprocate linearly, in a direction opposite that of the reciprocating shaft of the reciprocating mechanism, in response to the rotation of the pin.

21. The tool of claim 15, wherein the transmission mechanism includes a planetary gear assembly, including:
- a gear carrier;
- a sun gear received in the gear carrier, and coupled to an output shaft of the motor so as to receive a rotational force from the motor;
- at least one planet gear coupled in the gear carrier, and in meshed engagement with the sun gear, such that the carrier rotates in response to the rotational force received from the motor; and
- a pin fixed to and extending outward from a lower portion of the gear carrier such that the pin rotates together with the gear carrier, wherein the pin is coupled to the reciprocating mechanism such that the reciprocating mechanism reciprocates linearly in response to rotation of the pin.

22. The tool of claim 21, wherein the reciprocating mechanism includes a yoke at an end portion of the reciprocating shaft, wherein the pin extends through an elongated slot in the yoke so as to couple the planetary gear assembly and the reciprocating mechanism to the counterbalancing mechanism.

* * * * *